US007324502B2

(12) United States Patent
Sheldon et al.

(10) Patent No.: US 7,324,502 B2
(45) Date of Patent: Jan. 29, 2008

(54) SYSTEM AND METHOD FOR MAPPING A PSTN TRUNK TO A PACKET NETWORK ENDPOINT

(75) Inventors: David Charles Sheldon, Colorado Springs, CO (US); David John McDonald, Divide, CO (US); Douglas John Carson, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 985 days.

(21) Appl. No.: 10/151,374

(22) Filed: May 20, 2002

(65) Prior Publication Data

US 2003/0214971 A1 Nov. 20, 2003

(51) Int. Cl.
*H04L 12/66* (2006.01)

(52) U.S. Cl. ...................... 370/352; 370/401; 370/466; 370/467

(58) Field of Classification Search ........ 370/352–356, 370/357, 401, 467, 409, 410, 236, 496, 522; 379/126, 201.03, 133; 709/238, 218, 219, 709/236
See application file for complete search history.

(56) References Cited

U.S. PATENT DOCUMENTS

| | | | | |
|---|---|---|---|---|
| 6,614,781 B1 * | 9/2003 | Elliott et al. | ................. | 370/352 |
| 6,724,747 B1 * | 4/2004 | Arango et al. | ............... | 370/352 |
| 6,744,768 B2 * | 6/2004 | Vikberg et al. | ........ | 370/395.21 |
| 6,754,180 B1 * | 6/2004 | Christie | ....................... | 370/236 |
| 6,766,377 B1 * | 7/2004 | Grabelsky et al. | ........... | 709/238 |
| 6,798,745 B1 * | 9/2004 | Feinberg | ...................... | 370/235 |
| 6,856,676 B1 * | 2/2005 | Pirot et al. | ............. | 379/201.01 |
| 6,914,973 B2 * | 7/2005 | Marsico | .................. | 379/221.13 |
| 6,950,441 B1 * | 9/2005 | Kaczmarczyk et al. | ..... | 370/467 |
| 7,023,794 B2 * | 4/2006 | Khan et al. | .................. | 370/219 |
| 7,054,325 B1 * | 5/2006 | Archibald | .................... | 370/410 |
| 7,139,262 B1 * | 11/2006 | Elliott | ......................... | 370/351 |
| 7,139,263 B2 * | 11/2006 | Miller et al. | ................. | 370/352 |
| 2002/0150221 A1 * | 10/2002 | Carson et al. | .............. | 379/126 |
| 2003/0076815 A1 * | 4/2003 | Miller et al. | ................. | 370/352 |

* cited by examiner

*Primary Examiner*—Edan D. Orgad
*Assistant Examiner*—Chuong Ho

(57) ABSTRACT

A system for mapping dissimilar communication protocols is disclosed. In one embodiment, the system comprises user communication information that spans at least two dissimilar communication networks, a first communication protocol associated with a first communication network, a second communication protocol associated with a second communication network, and a software code segment configured to detect a call setup identifier and a call tear-down identifier associated with the first communication protocol, the software code segment also configured to detect a call setup identifier and call tear-down identifier associated with the second communication protocol, where the call setup identifier and the call tear-down identifier associated with the second communication protocol may occur within a predetermined amount of time before or after the call setup identifier or the call tear-down identifier associated with the first communication protocol. The system maps the call identifiers from the dissimilar networks so that the user information can be characterized over the dissimilar networks.

20 Claims, 18 Drawing Sheets

| PC/CIC | Endpoint | Count |
|---|---|---|
| 146-193-14+131 | S4/DS1-1/1@TGR02COS.cos0.company.net | 1 |
| 221-53-42+22 | S4/DS1-2/2@TGR02COS.cos0.company.net | 1 |
| 146-193-14+133 | S4/DS1-3/3@TGR02COS.cos0.company.net | 1 |

| PC/CIC | Endpoint | Count |
|---|---|---|
| 146-193-14+131 | S4/DS1-1/1@TGR02COS.cos0.company.net | 75 |
| 146-193-14+131 | S4/DS1-22/22@TGR02COS.cos0.company.net | 25 |
| 221-53-42+22 | S4/DS1-2/2@TGR02COS.cos0.company.net | 98 |
| 221-53-42+22 | NULL | 2 |
| 146-193-14+133 | S4/DS1-3/3@TGR02COS.cos0.company.net | 77 |
| 146-193-14+133 | NULL | 3 |
| 146-193-14+133 | S4/DS1-2/2@TGR02COS.cos0.company.net | 34 |
| 146-193-14+134 | S4/DS1-4/4@TGR02COS.cos0.company.net | 78 |

SYSTEM AND METHOD FOR MAPPING A PSTN TRUNK TO A PACKET NETWORK ENDPOINT

CROSS-REFERENCE TO RELATED APPLICATION

This application is related to co-pending, commonly assigned U.S. patent application Ser. No. 10/151,674, entitled "SYSTEM AND METHOD FOR CORRELATION AND REAL-TIME DISPLAY OF MAPPED PSTN TRUNK IDENTIFIERS AND GATEWAY CONTROL PROTOCOL ENDPOINTS," filed on May 20, 2002, which is hereby incorporated into this document by reference in its entirety.

TECHNICAL FIELD

The invention relates generally to communication systems, and, more particularly, to a system and method for mapping a public switched telephone network (PSTN) trunk identified by a first communication protocol, to a packet network endpoint identified by a second communication protocol.

BACKGROUND OF THE INVENTION

Existing telecommunications networks, such as the public switched telephone network (PSTN) are typically configured so that equipment (such as switches) in the transmission or bearer network, which carries user traffic (voice and data signals), is co-located with equipment (such as signaling points) in the associated signaling network, which carries control signals for coordinating the operation of the bearer network.

However, telecommunications networks are migrating to a distributed architecture in which the equipment that carries user traffic is separated from the equipment that provides signaling functionality Furthermore, a modern communication network typically comprises dissimilar networks that are coupled together. Such dissimilar networks can include, for example, the PSTN coupled to a packet network. These dissimilar networks generally employ different bearer technologies and/or signaling protocols.

Dissimilar telecommunications networks are typically interconnected via a "gateway" which provides the necessary conversions or adaptations between the bearer traffic and signaling protocol in each of the networks. In such an architecture an adaptation device, such as a media gateway (MG) (sometimes referred to as a "trunk gateway") can be used to couple the dissimilar networks. A control device, such as a media gateway controller (MGC), provides control functionality over the media gateway, but need not be co-located with the media gateway. Generally, the media gateway passes voice and data information. A media gateway controller can communicate with one or more media gateways using a control protocol, such as, for example, simple gateway control protocol (SGCP) and media gateway control protocol (MGCP).

Typically, a media gateway and a media gateway controller are each coupled to both a PSTN and a packet network. The media gateway controller may communicate with other media gateway controllers over the PSTN using extensions of current call control protocols such as Signaling System No.7 ISDN User Part (SS7 ISUP), Session Initiation Protocol (SIP—IETF RFC 2543), ITU Recommendation H.323, or Transaction Capabilities Application Part (TCAP). New protocols may be defined for this interface in the future.

A media gateway controller communicates with a media gateway using, for example, MGCP. Accordingly, the media gateway does receive signaling messages, but they are received from the media gateway controller.

When user traffic, such as a telephone call occurring between a node located in the PSTN and a node located in the packet network, spans the dissimilar communication networks, the user traffic is identified differently by the two communication networks.

Protocol monitoring applications, such as tracing across a signaling network the protocol messages associated with a call, or building a call data record (CDR) to summarize the key parameters relating to user traffic (i.e., a telephone call) requires the ability to map call identifiers across different protocols, which may refer to a single entity in multiple different, inconsistent ways.

Therefore, it would be desirable to have a network analysis device that is capable of mapping two or more different communication protocols referring to the same user traffic in a communication network that comprises at least two dissimilar communication networks.

SUMMARY

Embodiments of the invention include systems and methods for mapping call setup identifiers and call tear-down identifiers associated with dissimilar communication protocols. In one embodiment, a system maps dissimilar communication protocols comprising user communication information that spans at least two dissimilar communication networks, a first communication protocol associated with a first communication network, a second communication protocol associated with a second communication network, and a software code segment configured to detect a call setup identifier and a call tear-down identifier associated with the first communication protocol, the software code segment also configured to detect a call setup identifier and call tear-down identifier associated with the second communication protocol, where the call setup identifier and the call tear-down identifier associated with the second communication protocol may occur within a predetermined amount of time before or after the call setup identifier or the call tear-down identifier associated with the first communication protocol.

Other systems, methods, computer readable media, and features of the invention will be or become apparent to one with skill in the art upon examination of the following drawings and detailed description It is intended that all such additional systems, methods, computer readable media, and features, be included within this description, be within the scope of the present invention, and be protected by the accompanying claims

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the present invention.

FIG. 10 is a table illustrating the operation of the embodiment of the invention described in FIGS. 9A through 9C.

FIG. 11 is a table illustrating a sample mapping of the invention.

DETAILED DESCRIPTION OF THE PREFERRED EMBODIMENT

The network analysis system in accordance with embodiments of the invention can be implemented in software (e.g., firmware), hardware, or a combination thereof. In one embodiment, the network analysis system for mapping dissimilar communication network call identifiers is implemented using a dedicated test platform (such as a SUN workstation available from SUN Microsystems) having a dedicated processor, preferably executing the UNIX operating system. However, regardless of the manner of implementation, the software portion of the invention can be executed by a special or general purpose computer, such as a personal computer (PC; IBM-compatible, Apple-compatible, or otherwise), workstation, minicomputer, or mainframe computer. Furthermore, the invention may be implemented in other processing or computing devices, such as, for example but not limited to, a palmtop computer, a personal data assistant (PDA), or any other piece of network analysis equipment etc.

Figure 1:
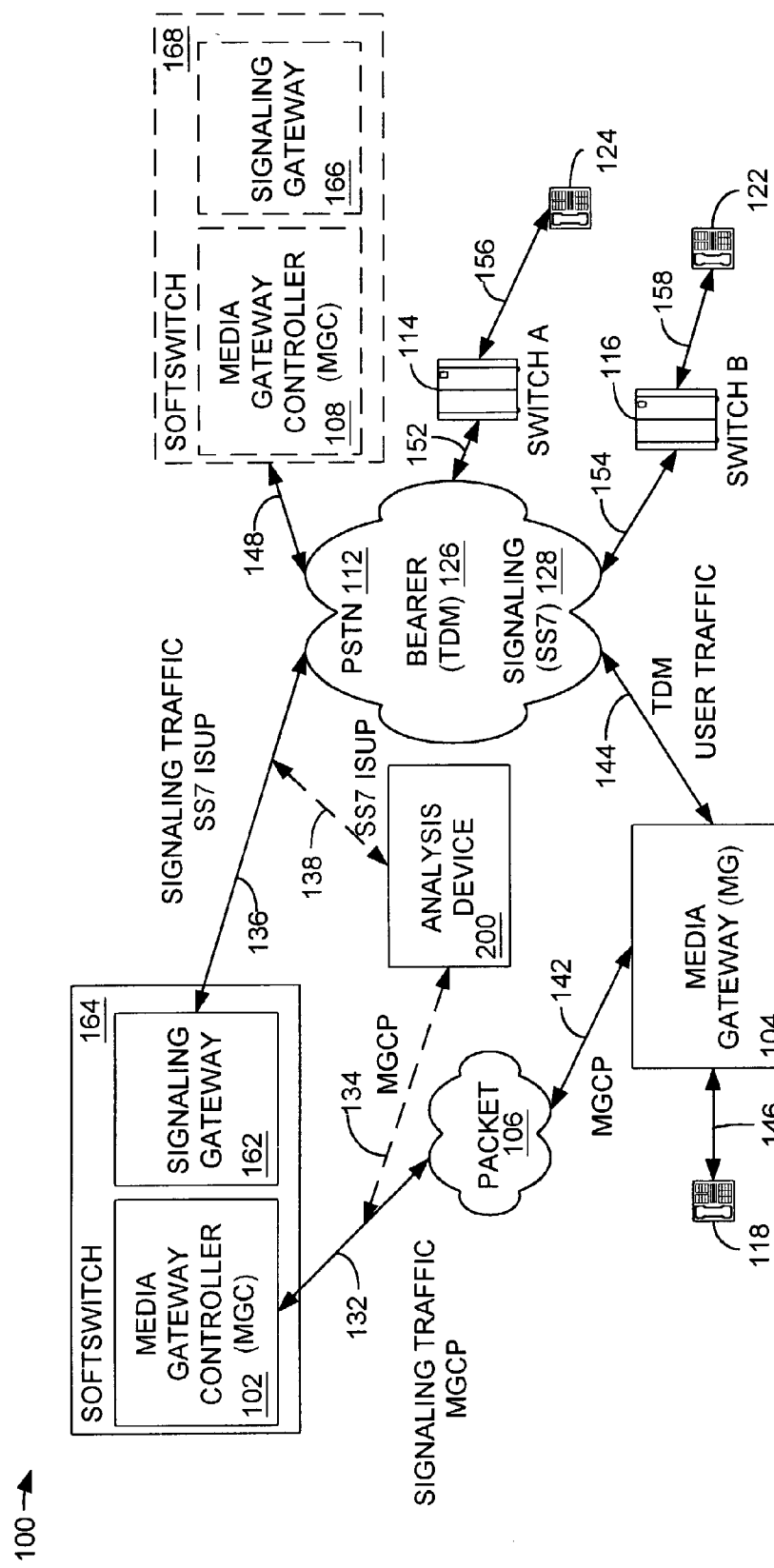
FIG. 1 is a schematic view illustrating an exemplar communication environment in which the network analysis device of the invention resides.

FIG. 1 is a schematic view illustrating an exemplar communication environment 100 in which embodiments of the invention reside. The communication environment 100 generally includes two dissimilar communication networks, a packet network 106 and a public switched telephone network (PSTN) 112. The PSTN 112 generally includes a bearer portion 126, over which user traffic, such as a telephone call using time division multiplexed (TDM) is communicated, and a signaling portion 128, over which signaling traffic, such as SS7 traffic, is carried. As will be described in detail below, embodiments of the invention apply generally to the signaling portion 128 of the PSTN 112. The packet network 106 can be, for example, an asynchronous transfer mode (ATM) network, an internet protocol (IP), or any other packet switching network.

The communication environment 100 also includes a media gateway controller (MGC) 102, which, when coupled with a signaling gateway 162, is sometimes referred to as a "softswitch" 164. The MGC 102 communicates with an MG 104 via the packet network 106 and communication lines 132 and 142. The signaling gateway 162 communicates with the PSTN 112 via connection 136. The media gateway controller 102 may also be coupled, via the PSTN 112, to one or more other media gateway controllers, an exemplar one of which is illustrated using reference numeral 108. Further, although not shown in FIG. 1, two MGCs may communicate over the packet network 106 using, for example, the SIP protocol. The media gateway 104 also couples to the PSTN 112 via connection 144.

A first switch (switch A) 114 couples to the PSTN 112 via connection 152 and a second switch (switch B) 116 couples to the PSTN 112 via connection 154. The switches 114 and 116, are typically part of the PSTN 112, and are typically located at telephone company central offices (not shown). For exemplar purposes only, a telephone 124 couples to switch 114 via connection 156 and a telephone 122 couples to switch 116 via connection 158. The connections 156 and 158 can be any type of communication channel that typically couples telephones to telephone company central offices, and is typically a copper-wire pair.

A phone 118 also couples to the media gateway 104 via connection 146. For example, the phone 118 can be an Internet phone. As known to those having ordinary skill in the art, both user traffic and signaling information typically traverse both the packet network 106 and the PSTN 112. The links 136 and 148 typically carry PSTN signaling traffic, such as signaling system seven (SS7) integrated services digital network user part (ISUP) or telephone user part (TUP) signaling messages. The connections 132, 142 typically carry packet network signaling traffic in the form of packets constructed using the media gateway control protocol (MGCP).

User traffic, for example a telephone call, that might occur between telephones 118 and 124 typically traverses communication links 146, 144, 152 and 156. Unfortunately, because the call traverses both the packet network 106 (communication line 146) and the PSTN 112 (communication lines 144, 152 and 156), the user traffic (telephone call) is identified by two different communication protocols. The packet portion of the call signaling is identified using the MGCP protocol, while the PSTN portion of the call signaling is identified using the SS7 ISUP protocol.

For example, a call setup message in the SS7 ISUP protocol would take the form of an initial address message (IAM), while a call tear-down message in the SS7 ISUP protocol would take the form of a release message (REL) or a release complete message (RLC). Conversely, in the packet network 106 using MGCP, a call setup message would take the form of a create connection (CRCX) message while a call tear-down message would take the form of a delete connection (DLCX) message.

In the packet network 106, communication endpoints, such as the telephone 118 are characterized by their "endpoint name," which typically takes the form "user identifier@domain.xxx," while in the PSTN 112, a call is identified by a point code (PC) that relates to its origination point code (OPC), destination point code (DPC) and the circuit, identified by its circuit identification code (CIC), on which it is carried. Therefore, because the signaling used in a single phone call between telephone 118 and 124 is characterized by two separate communication protocols (SS7 ISUP on the PSTN side and MGCP on the packet side), it is difficult to provide an end-to-end call record, commonly referred to as a call-flow record (CFR) of the single call because of the two different communication protocols used to signal the call.

In accordance with an embodiment of the invention, an analysis device 200 is coupled to the packet network 106 via connection 134 and is coupled to the PSTN 112 via connection 138. As will be described in greater detail below, the analysis device 200 includes a software code segment that allows the analysis device 200 to map the MGCP communication endpoints to the SS7 ISUP PC/CIC trunk identifiers in a manner such that a single phone call can be completely identified.

Figure 2:
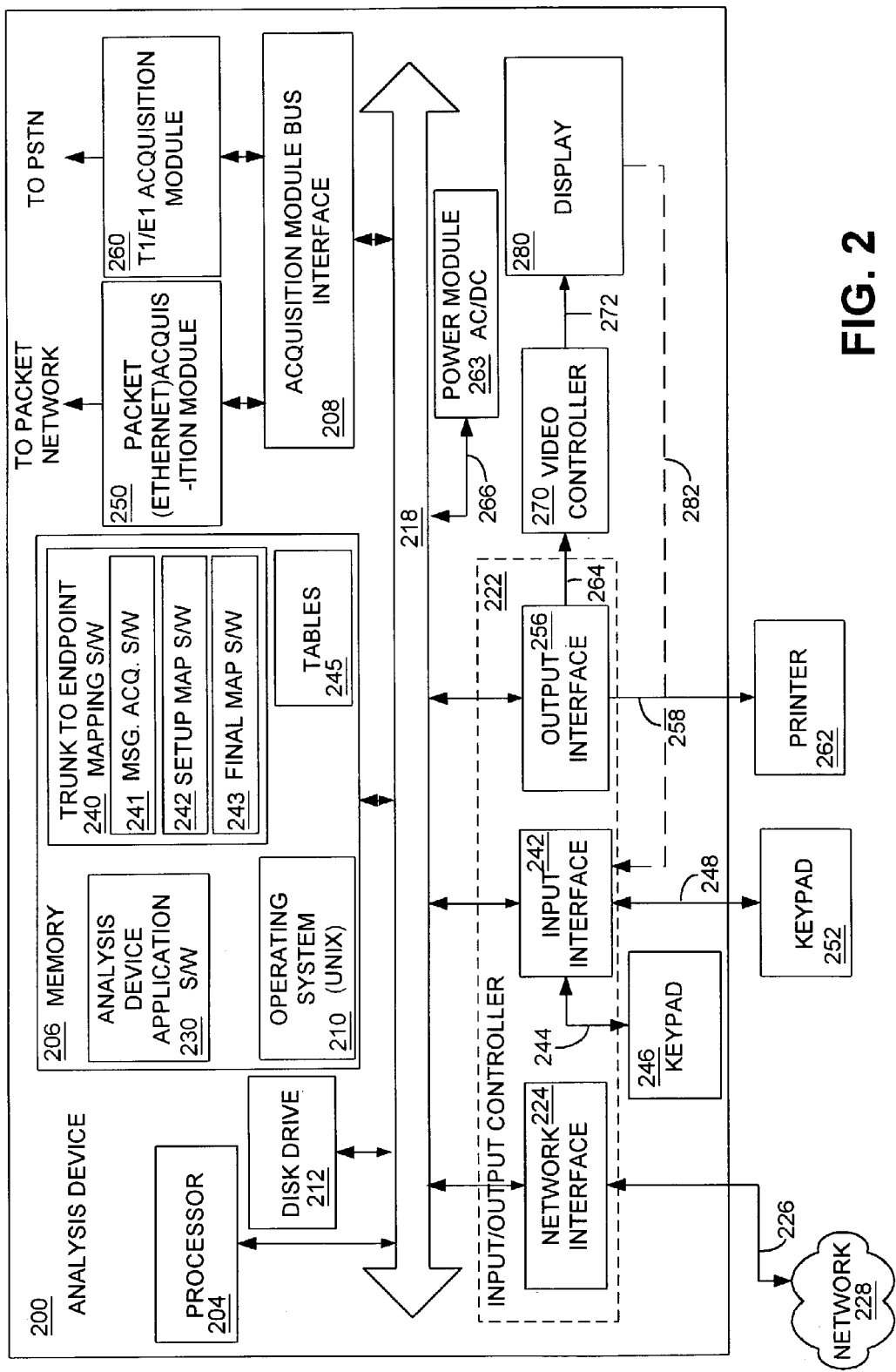
FIG. 2 is a block diagram illustrating an exemplar network analysis device constructed in accordance with an embodiment of the invention.

FIG. 2 is a block diagram illustrating an exemplar network analysis device 200 constructed in accordance with an embodiment of the invention. Generally, in terms of hardware architecture, as shown in FIG. 2, the analysis device 200 includes a processor 204, memory 206 (one or more random access memory (RAM) elements, read only memory (ROM) elements, etc.), an optional removable media disk drive 212, an acquisition module bus interface 208, referred to below as a "bus interface," an input/output controller 222 and a power module 263 that are connected together and can communicate with each other via a local interface 218. The local interface 218 can be, for example but not limited to, one or more buses or other wired or wireless connections, as is known to those having ordinary skill in the art. The local interface 218 may have additional elements, which are omitted for simplicity, such as buffers (caches), drivers, and controllers, to enable communications. Further, the local interface 218 includes address, control, and data connections to enable appropriate communications among the aforementioned components.

The processor 204 is a hardware device for executing software that can be stored in memory 206. The processor 204 can be any suitable processor for implementing the functionality of the analysis device 200. Preferably, the analysis device 200 executes on a SUN workstation available from SUN Microsystems.

The memory 206 can include any one or a combination of volatile memory elements (e.g., random access memory (RAM, such as DRAM, SRAM, etc.)) and nonvolatile memory elements (e.g., RAM, ROM, hard drive, tape, CDROM, etc.). Moreover, the memory 206 may incorporate electronic, magnetic, optical, and/or other types of storage media. Note that the memory 206 can have a distributed architecture, where various components are situated remote from one another, but can be accessed by the processor 204.

The software in memory 206 may include one or more separate programs, each of which comprise one or more code segments, which are an ordered listing of executable instructions for implementing logical functions. In the example of FIG. 2, the software in the memory 206 includes software in the form of an analysis device application software 230 and trunk-to-endpoint mapping software 240 The trunk-to-endpoint mapping software 240 includes message acquisition software 241, call setup mapping software 242 and final mapping software 243. The memory also includes tables 245, which are created by the trunk-to-endpoint mapping software 240, as will be described in detail below. The trunk-to-endpoint mapping software 240 is used to implement the functionality of the invention.

The memory 206 also includes one or more operating software modules, collectively referred to as operating system (O/S) 210. The O/S 210 may include software modules that perform some of the functionality of the test device 200 not specifically described herein In a preferred embodiment, the O/S 210 is the commonly available UNIX operating system available from SUN Microsystems. However, other operating systems may be used. The operating system 210 essentially controls the execution of other computer programs, such as the analysis device application software 230 and the trunk-to-endpoint mapping software 240, and provides scheduling, input-output control, file and data management, memory management, and communication control and related services. The processor 204 and operating system 210 define a computer platform, for which application programs, such as the analysis device application software 230 and the trunk-to-endpoint mapping software 240, are written in higher level programming languages. The trunk-to-endpoint mapping software 240 includes the executable instructions that allow the analysis device 200 to detect, decode and map dissimilar communication protocol messages that relate to the same user traffic.

The input/output controller 222 includes a network interface 224, an input interface 242 and an output interface 256 each in communication with the local interface 218. The network interface 224 couples the analysis device 200 to an external network 228 via connection 226. The external network can be any network to which the analysis device 200 may couple to exchange information. The input interface 242 is coupled to an internal keypad 246 via connection 244 and to an external keypad 252 via connection 248. The internal keypad 246 is located on the analysis device 200 while the external keypad 252 is an auxiliary keypad to which the test device 200 may be coupled.

The output interface 256 is coupled to a printer 262 via connection 258. The printer 262 can be used to provide a permanent record of the analysis results obtained by the analysis device 200. The output interface 256 also couples to a video controller 270 via connection 264. The video controller 270 couples to a display 280 via connection 272. The display 280 can be an LCD touch screen display capable of receiving input from a user, but may be any type of suitable display.

The disk drive 212 can be any storage element or memory device, and as used herein, generally refers to flash memory, sometimes referred to as compact flash (CF) or PC-card.

The power module 263 can power the analysis device 200 from an AC power source, or can include batteries and a built in charger to provide portable DC power.

The bus interface 208 provides both electrical and mechanical interfaces to a packet acquisition module 250 and a T1/E1 acquisition module 260. In accordance with an aspect of the invention, the packet acquisition module 250 couples to the packet network 106 (FIG. 1) and the T1/E1 acquisition module 260 couples to the PSTN 112. The packet acquisition module 250 monitors the packet network signaling traffic and the T1/E1 acquisition module 260 monitors the PSTN signaling traffic.

In accordance with particular embodiments of the invention, the trunk-to-endpoint mapping software 240 detects, decodes and stores PC/CIC information from SS7 messages and endpoint information from MGCP messages. Once the PC/CIC and endpoint name information is stored, the trunk-to-endpoint mapping software 240 builds a count table that maps the PSTN PC/CIC identifier to a corresponding packet network MGCP endpoint identifier. In this manner, a call record can be developed that defines both the packet network and PSTN aspects of the call.

When the analysis device 200 is in operation, the processor 204 is configured to execute software stored within the memory 206, to communicate data to and from the memory 206 and to generally control operations of the analysis device 200 pursuant to the software. The trunk-to-endpoint mapping software 240 is read by the processor 204, perhaps buffered within the processor 204, and then executed.

When portions of the network analysis system 200 are implemented in software, as is shown in FIG. 2, it should be noted that the O/S 210, analysis device application software 230 and the trunk-to-endpoint mapping software 240 can be stored on any computer-readable medium for use by or in connection with any computer-related system or method. In the context of this document, a computer readable medium is an electronic, magnetic, optical, or other physical device or means that can contain or store a computer program for use by or in connection with a computer related system or method. The O/S 210, analysis device application software 230 and the trunk-to-endpoint mapping software 240 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The hardware components of the network analysis system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
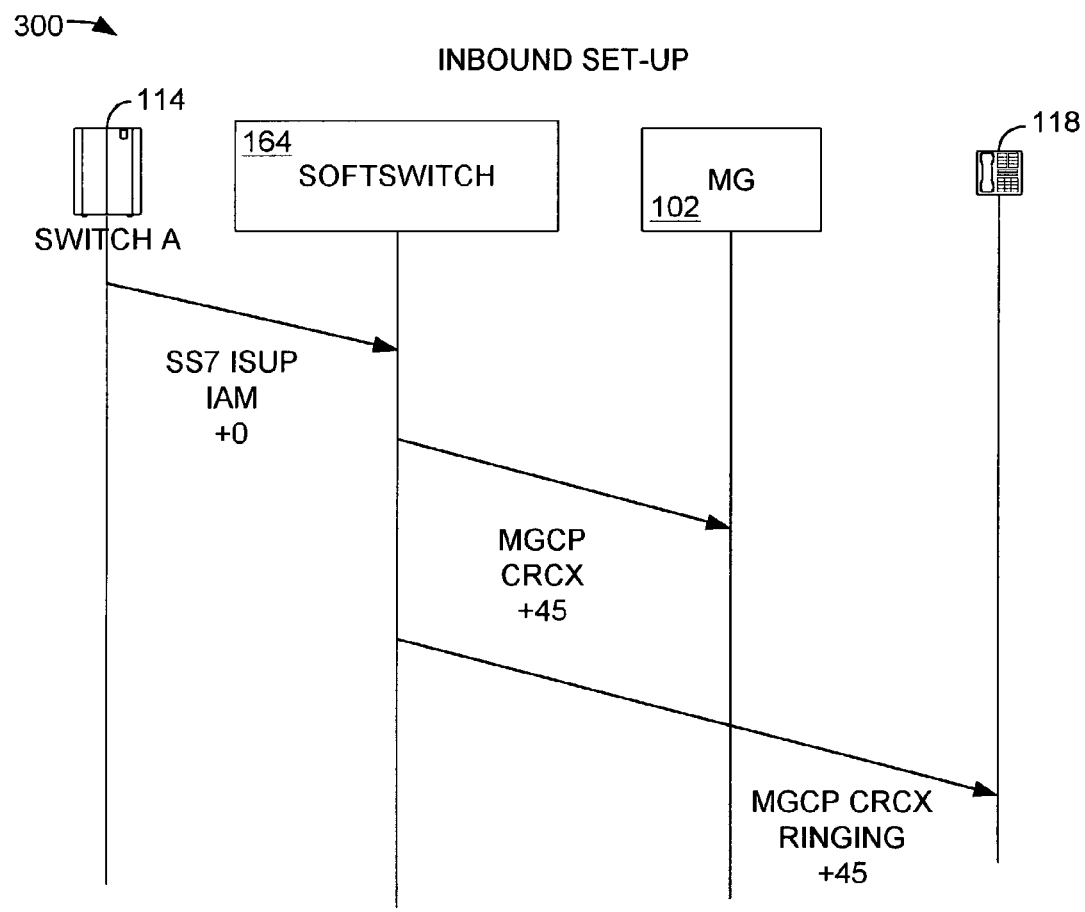
FIGS. 3 and 4 are call flow diagrams illustrating the signaling messages used to setup an inbound call and an outbound call, respectively.
Figure 4:
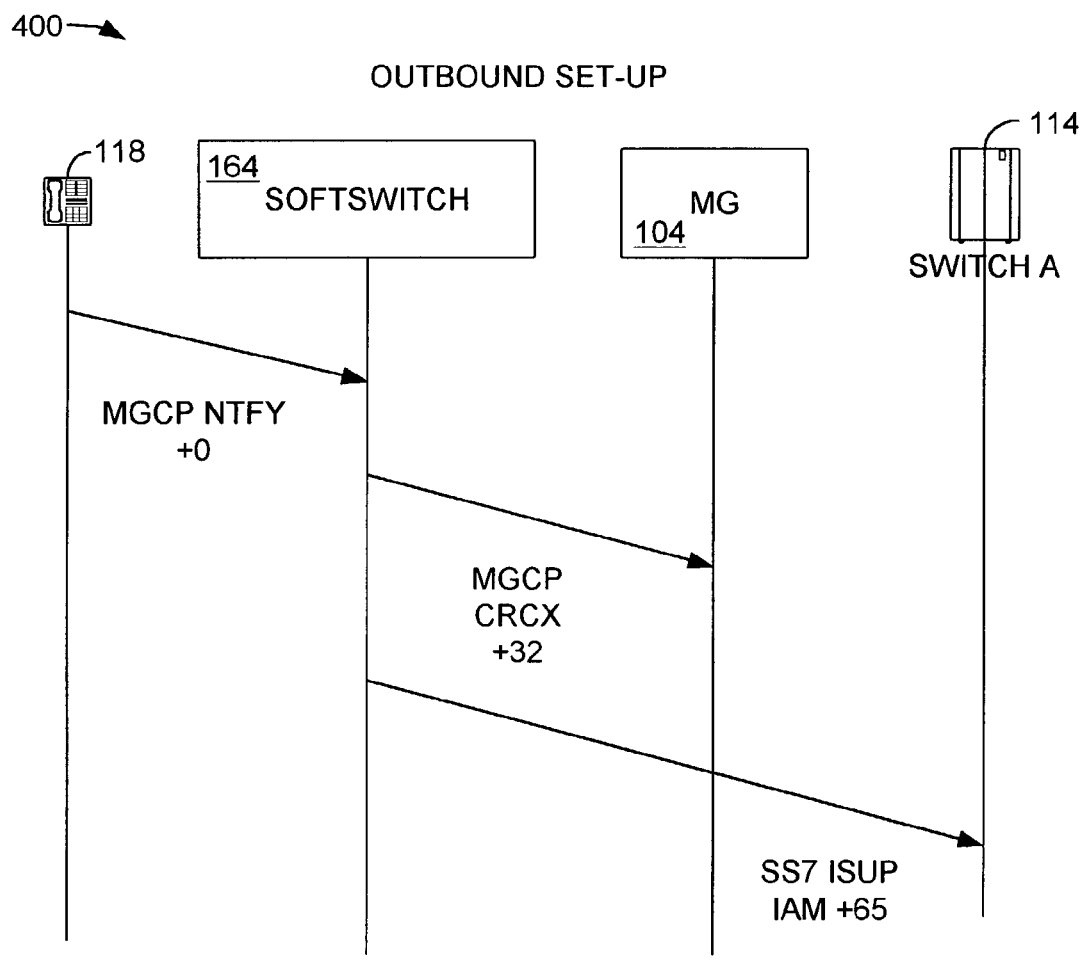

FIGS. 3 and 4 are call flow diagrams 300 and 400 illustrating the signaling messages used to setup an inbound call and an outbound call, respectively. However, prior to describing FIGS. 3 and 4, a brief overview of the SS7 and MGCP call setup and call tear-down messages will be provided.

An embodiment of the invention stores call setup signal messages and call tear-down signal messages and uses information in the messages to map an SS7 Point Code/Circuit Identification Code (PC/CIC) to a packet network endpoint name.

Call Setup Messages

In the SS7 signaling system the call setup message is the SS7 ISUP IAM and in MGCP the call setup message is the MGCP CRCX.

The trunk-to-endpoint mapping software 240 decodes the SS7 ISUP IAM message to extract the relevant OPC, DPC and CIC information. The following is an exemplar IAM message decode.

---
BEGIN DECODE----------------------------------------------------------
BSN: 100   BIB: 1   FSN: 29 FIB: 1   LI: 54
Si/Ssf: 05/08  Dpc: 153-028-030  Opc: 146-193-014  Sls: 24
CIC: 131
MT: 01
Nature of Connection Indicators
    Satellite Indicator: No satellite circuit in the connection
    Continuity Check Indicator: Not required
    Echo control Device Indicator: Outgoing half echo device not included
Forward Call Indicators
    Incoming International Call Indicator: Not an incoming international call
    End to End Method Indicator: No end-to-end method available
    Interworking Indicator: No interworking encountered
    IAM Segmentation Indicator: No indication
    ISDN User Part Indicator: ISUP used all the way
    ISDN User Part Preference Indicator: ISUP preferred all the way
    ISDN Access Indicator: Originating access non-ISDN
    SCCP Method Indicator: No indication
    Translated Called Numb Indicator: number translated
    QoR Attempt Indicator: no QoR routing attempt in prog
    Reserved for national use: 0
Calling Party's Category: Ordinary calling subscriber
Pointer to User Service Information: 3 octets
Pointer to Called Party Number: 6 octets
Pointer to Optional Part: 13 octets
User Service Information Length: 3 octets
    Info transfer Capability: Speech
    Coding Standard: CCITT standardized
    Information Transfer rate: 64 kbit/s
    Transfer Mode: Circuit mode
    Extension Indicator: No extension
    User Info Layer 1 Protocol: Recommendation G.711 u-law speech
Called Party Number Length: 7 octets
    Nature of Address Indicator: National (significant) number
    Odd/Even Indicator: Even num of address signals
    Numbering Plan Indicator: ISDN/Telephony
    Address Signal: 9093910010
Calling Party Number Id
    Length: 7 octets
    Nature of Address Indicator: Unique national number
    Odd/Even Indicator: Even num of address signals
    Screening Indicator: Network provided
    Presentation Restriction Indicator: Presentation allowed
    Numbering Plan Indicator: ISDN/Telephony
    Address Signal: 2022372470
Charge Number Id
    Length: 7 octets
    Nature of Address Indicator: ANI of the Calling party; national number
    Odd/Even Indicator: Even num of address signals
    Numbering Plan Indicator: ISDN/Telephony
    Address Signal: 9022372470
Jurisdiction Information Id
    Length: 3 octets
    Address Signal: 202237
Timestamp: 17:07:30.65480762 GMT
END DECODE----------------------------------------------------------

Within the SS7 ISUP IAM message, three fields are significant to the invention. These are the originating point code (OPC), the destination point code (DPC), and the circuit identification code (CIC). These fields are in the second and third lines of the decode above (indicated above in bold). The OPC (146-193-014) is the PC of the SS7 network entity that originated the call. The DPC (153-028-030) is the PC of the SS7 network entity that is the call destination. The CIC (131) is used to identify the specific trunk between the SS7 switches. If the OPC is equal to the PC of the softswitch 164, then the SS7 ISUP IAM message represents an outbound call. If the DPC is equal to the PC of the softswitch 164, then the SS7 ISUP IAM message represents an inbound call.

The trunk-to-endpoint mapping software 240 identifies the call identified by this SS7 ISUP IAM message by appending the CIC to the PC that is not equal to the PC of the softswitch. Consider the decode above, if the softswitch PC is 153-28-30 (equal to DPC), then the trunk-to-endpoint mapping software 240 will identify this SS7 ISUP IAM by the PC/CIC 146–193–14+131 (OPC+CIC). As will be described in detail below, the trunk-to-endpoint mapping software 240 will ultimately map the PC/CIC (146–193–14+131) to a packet network endpoint name.

The trunk-to-endpoint mapping software 240 decodes the MGCP CRCX message to extract the relevant end point and call identification information The following is an exemplar decode of an MGCP CRCX message. For a given SS7 ISUP IAM message, the trunk-to-endpoint mapping software 240 will attempt to map all MGCP CRCX messages that occur before (for an outbound call) or after (for an inbound call) the subject SS7 ISUP IAM message.

```
BEGIN DECODE----------------------------------------------------------------
MGCP
    Command [CRCX]:       Create Connection
    Transaction ID    =   12104586
    Endpoint          =   S4/DS1-1/1@TGR02COS.cos0.company.
                          net
    Version           =   MGCP 0.1
Parameters:
    Notified Entity          [N]:
mgcp.aSCT1CA.cos0.company.net: 2427
    Call ID                  [C]:      66d3
    Local Options            [L]:
        p: Packetization Period  =  20,
        a: Compression Alg.      =  PCMU
                                    PCMA
        e: Echo Cancellation     =  on,
        s: Silence Suppression   =  off,
        t: Service Type          =  a0,
        nt: Network Type         =  IN
    Connection Mode          [M]:     sendrecv-Gateway should
send and receive packets.
SDP Information-Audio Service:
    Version                  [v]:     0
    Origin Identifiers       [o]:
        Username             =  –
        Session ID           =  2708
        Session Version      =  0
        Network Type         =  IN
        Address Type         =  IP4
        Address              =  64.213.155.8
    Session Name             [s]:     Cisco SDP 0
    Connection Data          [c]:
        Network Type   =  IN
        Address Type   =  IP4
        Connection     =  64.213.155.8
    Times                    [t]:     Start = 0 Stop = 0
    Media Description        [m]:
        Media Type     =  audio
        Port           =  16388
        Transport Prot =  RTP/AVP
        Format(s)      =  0-G.711: Mu-law pulse code
mod(PCMU), 1 chan audio (8 KHz)
                          8-G.711: A-law Pulse code mod.
(PCMA) 1 chan audio (8 KHz)
END DECODE----------------------------------------------------------------
```

Two fields of interest within the MGCP CRCX message are the Endpoint name field and the Call ID field, on the fourth and ninth lines of the decode above (both illustrated in bold). The Call ID field (66d3 in the decode above) is unique to a single call and can be used to match the MGCP CRCX call setup message with the MGCP DLCX call tear-down message (to be described below). The Endpoint name field, (in this example S4/DS1-1/1@TGR02COS.cos0.company net) identifies the endpoint to which the call is directed and also identifies the type of endpoint. The trunk-to-endpoint mapping software 240 uses MGCP CRCX messages in which the type of the endpoint is a trunk gateway. In accordance with an aspect of the invention, this endpoint name (in this example S4/DS1-1/1@TGR02COS.cos0.company.net) will be mapped to a PC/CIC.

Call Tear-down Messages

In the SS7 signaling system the call tear-down message is the SS7 ISUP REL or RLC and in MGCP the call tear-down message is the MGCP CLCX.

The trunk-to-endpoint mapping software 240 decodes an SS7 ISUP REL message to extract the relevant OPC, DPC and CIC information. The following is an exemplar decode of an SS7 ISUP REL message.

```
BEGIN DECODE----------------------------------------------------------------
BSN: 53    BIB: 1    FSN: 100    FIB: 1    LI: 16
Si/Ssf: 05/09  Dpc: 153-028-030  Opc: 146-193-014  Sls: 24
CIC: 131
MT: 12
Pointer to Cause Indicators: 2 octets
Pointer to Optional Part: 0 octets
Cause Indicator Length: 2 octets
    Location: Local local network
    Coding Standard: CCITT standard
    Cause Value: Normal clearing
Timestamp: 17:08:28.590792048 GMT
END DECODE----------------------------------------------------------------
```

In the absence of an SS7 ISUP REL message, the trunk-to-endpoint mapping software 240 decodes an SS7 ISUP RLC message to extract the relevant OPC, DPC and CIC information. The following is an exemplar decode of an SS7 ISUP RLC message.

```
BEGIN DECODE----------------------------------------------------------------
BSN: 100   BIB: 1    FSN: 54    FIB: 1    LI: 11
Si/Ssf: 05/10  Dpc: 146-193-014  Opc: 153-028-030  Sls: 3
CIC: 131
MT: 16
Timestamp: 17:08:28.602782759 GMT
END DECODE----------------------------------------------------------------
```

The SS7 ISUP REL and SS7 ISUP RLC messages are similar. The trunk-to-endpoint mapping software 240 first attempts to use the SS7 ISUP REL message. If the SS7 ISUP REL message is not received, then the trunk-to-endpoint mapping software 240 will use the SS7 ISUP RLC message.

As in the SS7 ISUP IAM message, three fields are of interest in the SS7 ISUP REL/RLC messages are the OPC field, the DPC field, and the CIC field. The trunk-to-endpoint mapping software 240 identifies this message by appending the CIC to the PC that is not equal to the PC of the softswitch PC. Consider the SS7 ISUP REL decode above. If the softswitch PC is 153–28–30 (equal to DPC), then the trunk-to-endpoint mapping software 240 identifies this SS7 ISUP REL by the PC/CIC 146–193–14+131 (OPC+CIC). The trunk-to-endpoint mapping software 240 can then map the SS7 ISUP REL call tear-down message to a single SS7 ISUP IAM call setup message.

The trunk-to-endpoint mapping software 240 decodes an MGCP DLCX message to obtain the relevant endpoint name and Call ID information. The following is an exemplar decode of an MGCP DLCX message. The MGCP DLCX message is associated with an MGCP CRCX message by the Call ID field.

```
BEGIN DECODE------------------------------------------------------------
MGCP
    Command [DLCX]:     Delete Connection
    Transaction ID  =   12104588
    Endpoint        =   S4/DS1-1/1@TGR02COS.cos0.company.
                        net
    Version         =   MGCP 0.1
Parameters:
    Connection ID               [I]:    4C7D2
    Call ID                     [C]:    66d3
Timestamp: 17:25:44.636891809 GMT
END DECODE--------------------------------------------------------------
```

The Call ID field is of significance to the trunk-to-endpoint mapping software 240. The Call ID field (66*d*3 in the decode above) uniquely maps the MGCP DLCX call tear-down message to a single MGCP CRCX call setup message.

Inbound Calls

The trunk-to-endpoint mapping software 240 distinguishes between inbound calls and outbound calls. Inbound calls are calls originated outside the softswitch 164 Accordingly, with an inbound call, an SS7 ISUP IAM message is sent to the softswitch 164.

In such a case, the DPC of the SS7 ISUP IAM message will be equal to the PC of the softswitch 164. The trunk-to-endpoint mapping software 240 detects, decodes and stores the OPC+CIC from the SS7 ISUP IAM message so that it can be mapped to an MGCP endpoint name (trunk gateway).

Referring now to FIG. 3, the call diagram 300 depicts the call setup messages transferred when establishing an inbound call. FIG. 3 includes messages transferred among switch A 114, MGC 102 (softswitch 164), MG 104 and phone 118, all of FIG. 1.

Each message contains a number that represents the delta time in milliseconds from the first message. The delta time varies between calls depending on network traffic and congestion, and the numbers illustrated represent an approximate time span between messages.

At time "0" the switch A 114 sends an SS7 ISUP IAM message to the softswitch 164. At time "+45" the softswitch 164 sends a CRCX message to the MG 104. At time "+65" the MGCP CRCX message sent to the MG 104 causes the phone 118 to ring. Note that the SS7 ISUP IAM comes before the MGCP CRCX in an inbound call.

Outbound Calls

An outbound call originates from the MGC (softswitch). Accordingly, an SS7 ISUP IAM message is sent from the MGC (softswitch). In this case, the OPC of the SS7 ISUP IAM message will be equal to the PC of the softswitch 164. The trunk-to-endpoint mapping software 240 stores the DPC+CIC from the SS7 ISUP IAM message and maps the DPC+CIC to an MGCP endpoint name (trunk gateway).

Referring now to FIG. 4, the call diagram 400 depicts the call setup messages transferred when establishing an outbound call. As described above with respect to FIG. 3, each message contains a number that represents the delta time in milliseconds from the first message. The delta time varies between calls depending on traffic and network congestion, and the numbers illustrated represent an approximate time span between messages.

At time "0" the phone 118 sends an MGCP notify (NTFY) message to the softswitch 164. At time "+32" the softswitch 164 sends an MGCP CRCX message to the MG 104. At time "65" the softswitch 164 sends an SS7 ISUP IAM message to the switch A 114. Note that the MGCP CRCX comes before the SS7 ISUP IAM message in an outbound call.

Figure 5A:
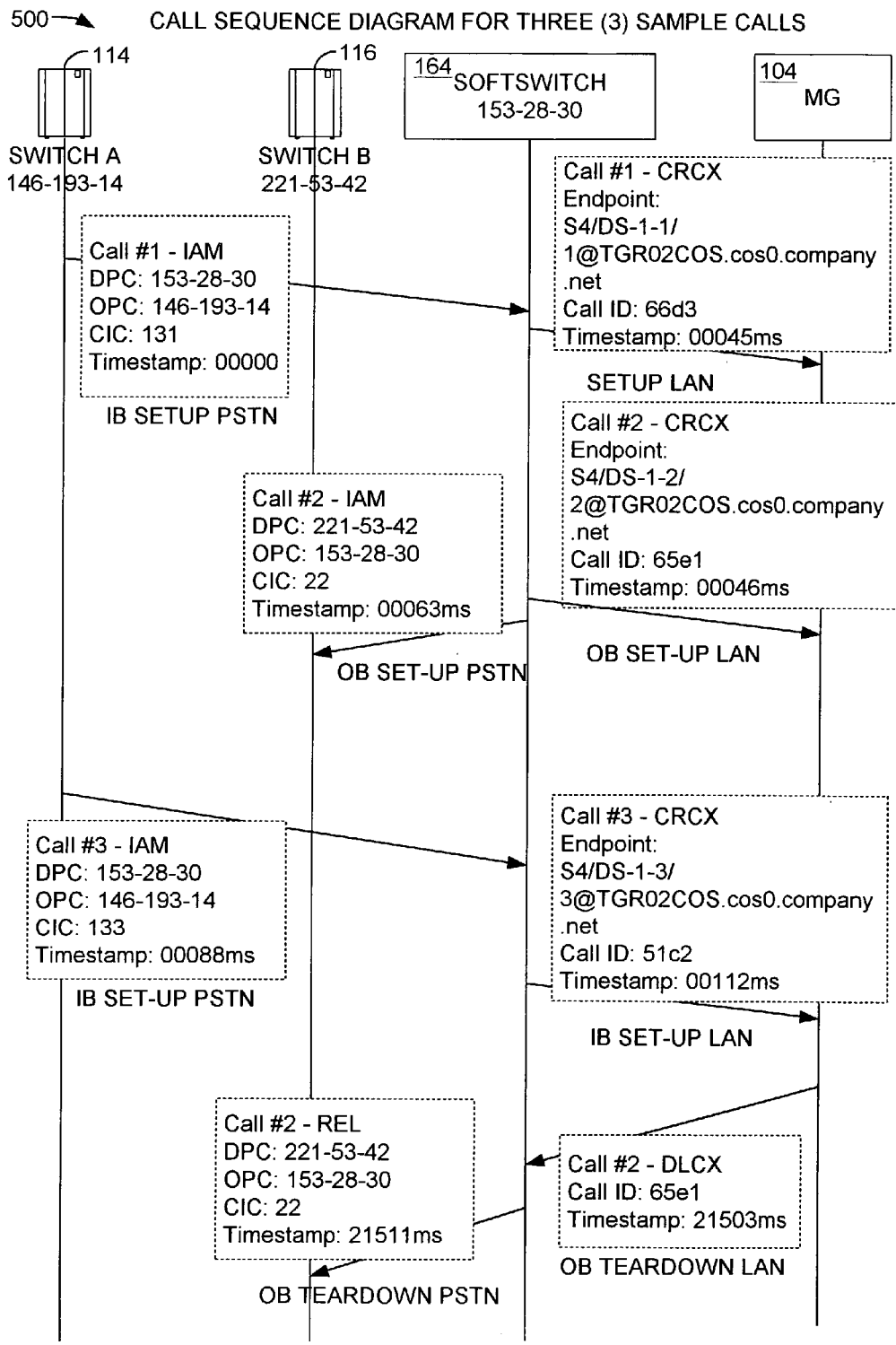
FIGS. 5A and 5B collectively illustrate a call sequence diagram of three calls that will be used to illustrate the operation of certain embodiment of the invention.
Figure 5B:
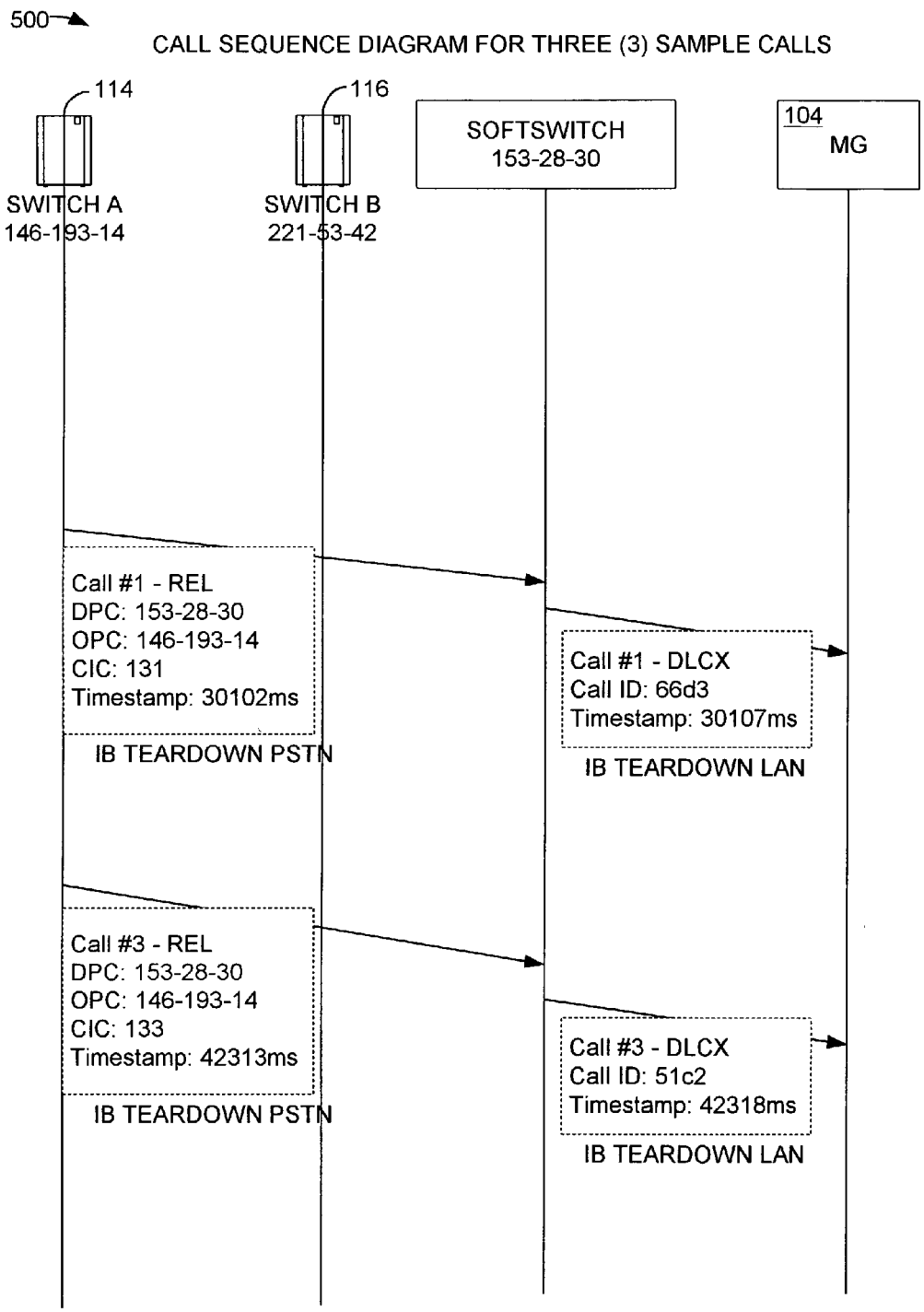

FIGS. 5A and 5B collectively illustrate a call sequence diagram 500 of three exemplar calls that will be used to illustrate the operation of certain embodiments of the invention. In accordance with an embodiment of the invention, the message acquisition software 241 detects, decodes and stores all call setup (SS7 ISUP IAM and MGCP CRCX) and call tear-down messages (SS7 ISUP REL/RLC and MGCP DLCX).

All SS7 ISUP IAM messages in which the OPC or DPC is equal to a known MGC (softswitch) PC are stored in a list. The following Table 1 illustrates a list of IAM messages using the call sequence of FIGS. 5A and 5B.

TABLE 1

| SS7 ISUP IAM Message List |
| --- |
| SS7 ISUP IAM Call #1 |
| DPC: 153-28-30<br>OPC: 146-193-14<br>CIC: 131<br>Timestamp: 00000 ms |
| SS7 ISUP IAM Call #2 |
| DPC: 221-53-42<br>OPC: 153-28-30<br>CIC: 22<br>Timestamp: 00063 ms |
| SS7 ISUP IAM Call #3 |
| DPC: 153-28-30<br>OPC: 146-193-14<br>CIC: 133<br>Timestamp: 00088 ms<br>. . . |

Each MGCP CRCX message has a source and a destination. Because MGCP CRCX messages in which the destination is a trunk (media) gateway (MG) are being mapped to the PC/CIC, the message acquisition software 241 analyzes the MGCP CRCX message if the destination is a media gateway. MGCP CRCX messages in which the endpoint is an MG (such as MG 104 of FIG. 1) are stored in a list. When the analysis device 200 receives an MGCP CRCX message, the message acquisition software 241 analyzes the "Endpoint" field in the MGCP CRCX message and determines the type of the endpoint by, for example, a table lookup or the use of regular expressions.

1. Table Lookup

An MGCP CRCX message is a user datagram protocol (UDP) message. A UDP message is embedded within an IP message. In the IP header of the IP message, the source IP address and the destination IP address are given. The destination IP address (for example, 130.29.44.199) is the endpoint of the MGCP CRCX message. It should be noted that while the MGCP CRCX message decode illustrated above shows a decode of an MGCP CRCX message, this decode does not show the IP header information and therefore does not show the source and destination IP addresses. Having the destination IP address allows a table lookup to be performed. Using the IP header information including the source and destination IP addresses, a table containing two (2) columns and multiple rows can be created. Each row contains an IP address in the first column and an endpoint type in the second column. Given an IP address, the trunk-to-endpoint mapping software 240 can look in the table for a matching IP address and subsequently get the corresponding endpoint type if the IP address is found 2. Regular Expressions As known to those having ordinary skill in the art, the term "regular expressions" refers to pattern descriptions that enable matching of identifier strings to the "regular expression." Each MGCP CRCX message has an associated endpoint name. For example, in the decode of the MGCP CRCX message illustrated above, the MGCP CRCX message decode includes the endpoint name "S4/DS1-1/1@TGR02COS.cos0.company.net".

For a given network, all MGCP CRCX messages in which the endpoint is a trunk gateway will have a similar pattern in the name with few variations. Knowing, or estimating, this pattern, it is possible to define a regular expression that can be used to evaluate the MGCP CRCX endpoint name and conclude if the endpoint type is a trunk gateway. Therefore, given the trunk endpoint names used in this document as examples in the MGCP CRCX messages, one would come up with the following regular expression to evaluate if the MGCP CRCX endpoint is a trunk gateway:

"S([0-9])(.*)DS(.*)@TGR02COS.cos0.company.net."

The following Table 2 shows a list of MGCP CRCX messages from the call sequence diagram of FIGS. 5A and 5B.

TABLE 2

MGCP CRCX Message List

MGCP CRCX Call #1

Endpoint: S4/DS1-
    1/1@TGR02COS.cos0.company.net
Call ID: 66d3
Timestamp: 00045 ms MGCP CRCX Call #2

Endpoint: S4/DS1-
    2/2@TGR02COS.cos0.company.net
Call ID: 65e1
Timestamp: 00046 ms MGCP CRCX Call #3

Endpoint: S4/DS1-
    3/3@TGR02COS.cos0.company.net
Call ID: 51c2
Timestamp: 00112 ms
. . .

The message acquisition software 241 stores SS7 ISUP REL messages that meet the following conditions. The DPC or OPC is equal to the PC of the softswitch 164, and the associated PC/CIC maps to an active SS7 ISUP IAM message. An active SS7 ISUP IAM Message is one in which the PC/CIC can be found in the IAM list (Table 1) or the PC/CIC—MGCP CRCX hash map (Table 5 below) and in which the call tear-down messages have yet to be received. Only SS7 ISUP REL/RLC messages that can be associated with an active SS7 ISUP IAM message are stored for final mapping by the final mapping software 243.

When the above mentioned conditions are satisfied the SS7 ISUP REL message will be stored in a hash map (Table 3) in which the PC/CIC is the key and the message is the value. Table 3 shows the SS7 ISUP REL hash map using call data from the call sequence diagram shown in FIGS. 5A and 5B.

TABLE 3

SS7 ISUP REL Message Hash Map

| Key | Value |
| --- | --- |
| 146-193-14+131 (Call #1) | DPC: 153-28-30<br>OPC: 146-193-14<br>CIC: 131<br>Timestamp: 30102 ms |
| 221-53-42+22 (Call #2) | DPC: 221-53-42<br>OPC: 153-28-30<br>CIC: 22<br>Timestamp: 21511 ms |
| 146-193-14+133 (Call #3) | DPC: 153-28-30<br>OPC: 146-193-14<br>CIC: 133<br>Timestamp: 42313 ms |
| 146-193-14+133 (Call #3) | DPC: 153-28-30<br>OPC: 146-193-14<br>CIC: 133<br>Timestamp: 42313 ms |
| . . . | |

An SS7 ISUP RLC message is handled similar to an SS7 ISUP REL message. An SS7 ISUP RLC message is stored under the same conditions and in the same manner as an SS7 ISUP REL message. An SS7 ISUP RLC message is used if an SS7 ISUP REL message is not received for a given call.

The message acquisition software 241 stores MGCP DLCX messages that have a Call ID field that is equal to the Call ID field of an active MGCP CRCX message. An active MGCP CRCX message is one in which the Call ID field can be found in the MGCP CRCX list (Table 2) or in the PC/CIC—MGCP CRCX hash map (Table 5 below) and in which a call tear-down message has yet to be received.

Only an MGCP DLCX message that can be associated with an active MGCP CRCX message is stored for use by the final mapping software 243. The MGCP DLCX message will be stored in a hash map (Table 4) in which the Call ID field is the key and the message is the value. Table 4 shows the MGCP DLCX hash map using message information from the call sequence diagram shown in FIGS. 5A and 5B.

TABLE 4

MGCP DLCX Message Hash Map

| Key | Value |
| --- | --- |
| 66d3 (Call #1) | Call ID: 66d3<br>Timestamp: 30107 ms |
| 65e1 (Call #2) | Call ID: 65e1<br>Timestamp: 21503 ms |
| 51c2 (Call #3) | Call ID: 51c2<br>Timestamp: 42318 ms |

With reference now to FIGS. 5A and 5B, the operation of the call setup mapping software 242 (FIG. 2) will be described. The call setup mapping software 242 keys on the SS7 ISUP IAM messages (i.e., the SS7 call setup messages) from Table 1 above. For each message in the SS7 ISUP IAM list, the call setup mapping software 242 associates all MGCP CRCX (MGCP call setup) messages that occur within a predetermined amount of time (IAM_CRCX_delta_time) before (for an outbound call) or after (for an inbound call) the detection of the SS7 ISUP IAM message.

The results of the mapping are stored in a hash map (Table 5 below) with the SS7 ISUP IAM PC/CIC as the key and a list of closely occurring MGCP CRCX messages in the value field.

Preferably the IAM_CRCX_delta_time value is 2000 ms, however, depending on the network, other delta time values may be possible. The following Table 5 shows the PC/CIC—MGCP CRCX hash map that stores PC/CIC and associated MGCP CRCX messages.

TABLE 5

PC/CIC - MGCP CRCX Hash Map

| Key | Value |
|---|---|
| 146-193-14+131(Call #1) | Endpoint: S4/DS1-/1@TGR02COS.cos0.company.net<br>Call ID: 66d3<br>Timestamp: 00045 ms<br>(Call #1) |
| | Endpoint: S4/DS1-2/2@TGR02COS.cos0.company.net<br>Call ID: 65e1<br>Timestamp: 00046 ms<br>(Call #2) |
| | Endpoint: S4/DS1-3/3@TGR02COS.cos0.company.net<br>Call ID: 51c2<br>Timestamp: 00112 ms<br>(Call #3) |
| 221-53-42+22 (Call #2) | Endpoint: S4/DS1-/1@TGR02COS.cos0.company.net<br>Call ID: 66d3<br>Timestamp: 00045 ms<br>(Call #1) |
| | Endpoint: S4/DS1-2/2@TGR02COS.cos0.company.net<br>Call ID: 65e1<br>Timestamp: 00046 ms<br>(Call #2) |
| 146-193-14+133(Call #3) ... | Endpoint: S4/DS1-3/3@TGR02COS.cos0.company.net<br>Call ID: 51c2<br>Timestamp: 00112 ms<br>(Call #3) |

Based on the call sequence diagram in FIGS. 5A and 5B, three entries are shown in Table 5, one entry for each call. Call #1 is identified by the PC/CIC 146-193-14+131. Call #1 originates in switch A 114 and is an inbound call (the DPC of the IAM message equals the PC of the MGC 102 (softswitch 164). Therefore, the call setup mapping software 242 associates all MGCP CRCX messages (originating from the MGC 102 (softswitch 164)) occurring within IAM_CRCX_delta_time after the SS7 ISUP IAM message (call #1) with the SS7 ISUP IAM message of call #1. If IAM_CRCX_delta_time is 2000 ms, all three MGCP CRCX messages in the call sequence diagram 500 are associated with 146-193-14+131 (the PC/CIC of the SS7 ISUP IAM message of call #1.

Call #2 is identified by the PC/CIC 221-53-42+22. Call #2 originates from a phone (or other communication device) coupled to the MG 104, and is an outbound call. Therefore, the call setup mapping software 242 associates MGCP CRCX messages occurring within IAM_CRCX_delta_time before the SS7 ISUP IAM message (for call #2). If IAM_CRCX_delta_time is 2000 ms, the MGCP CRCX messages from Call #1 and Call #2 are associated with PC/CIC 221-53-42+22 (the PC/CIC of the switch B 116).

Call #3 is identified by the PC/CIC 146-19-14+133. Call #3 is similar to call #1 in that it is an inbound call (the DPC of the IAM message equals the PC of the MGC 102 (softswitch 164)) originating in switch A 114. The MGCP CRCX from call #3 is the only MGCP CRCX message occurring within IAM_CRCX_delta_time after the SS7 ISUP IAM message of call #1.

Figure 6A:
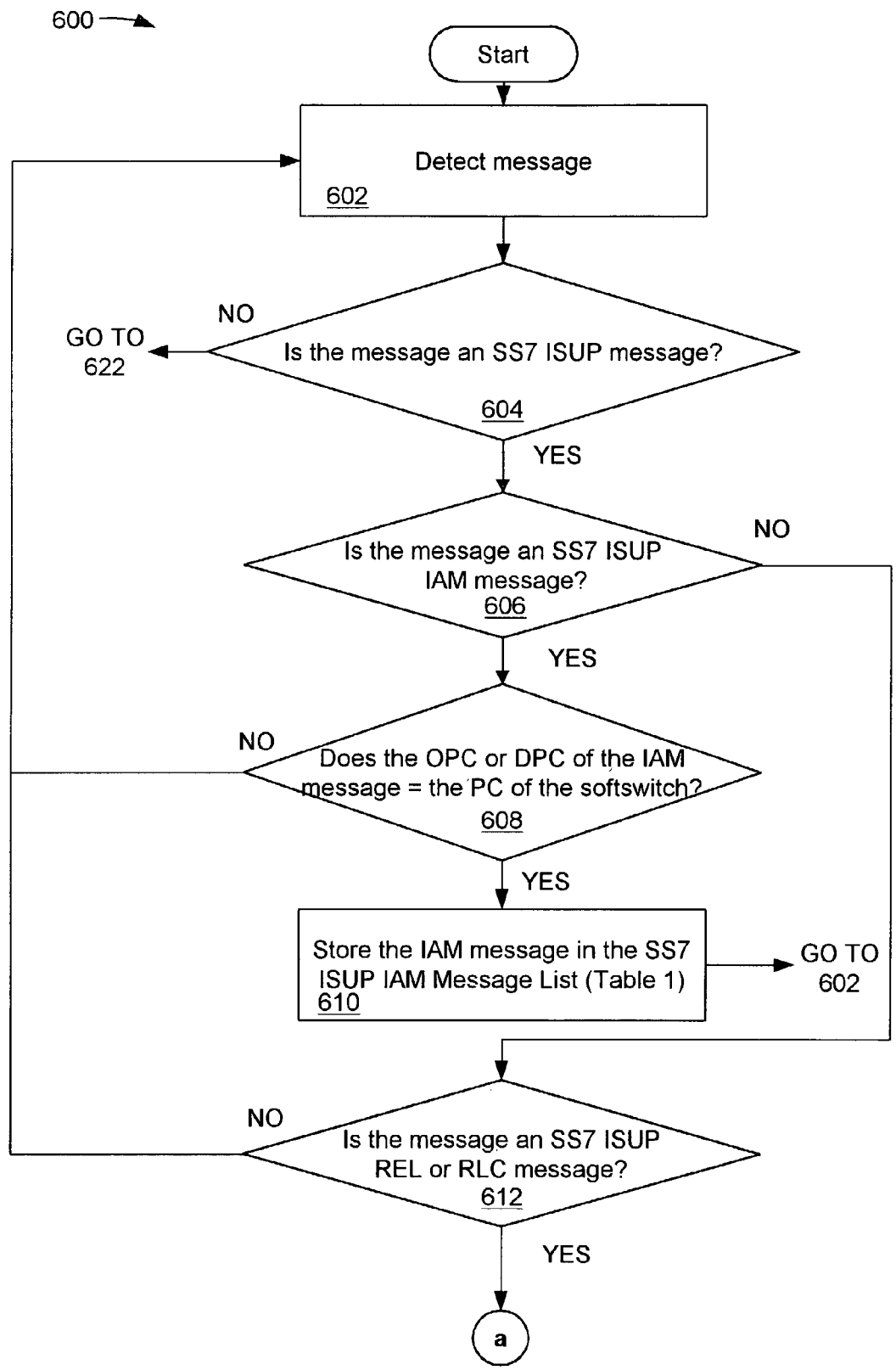
FIGS. 6A through 6C comprise a flowchart collectively illustrating the operation of the message acquisition software of FIG. 2.
Figure 6B:
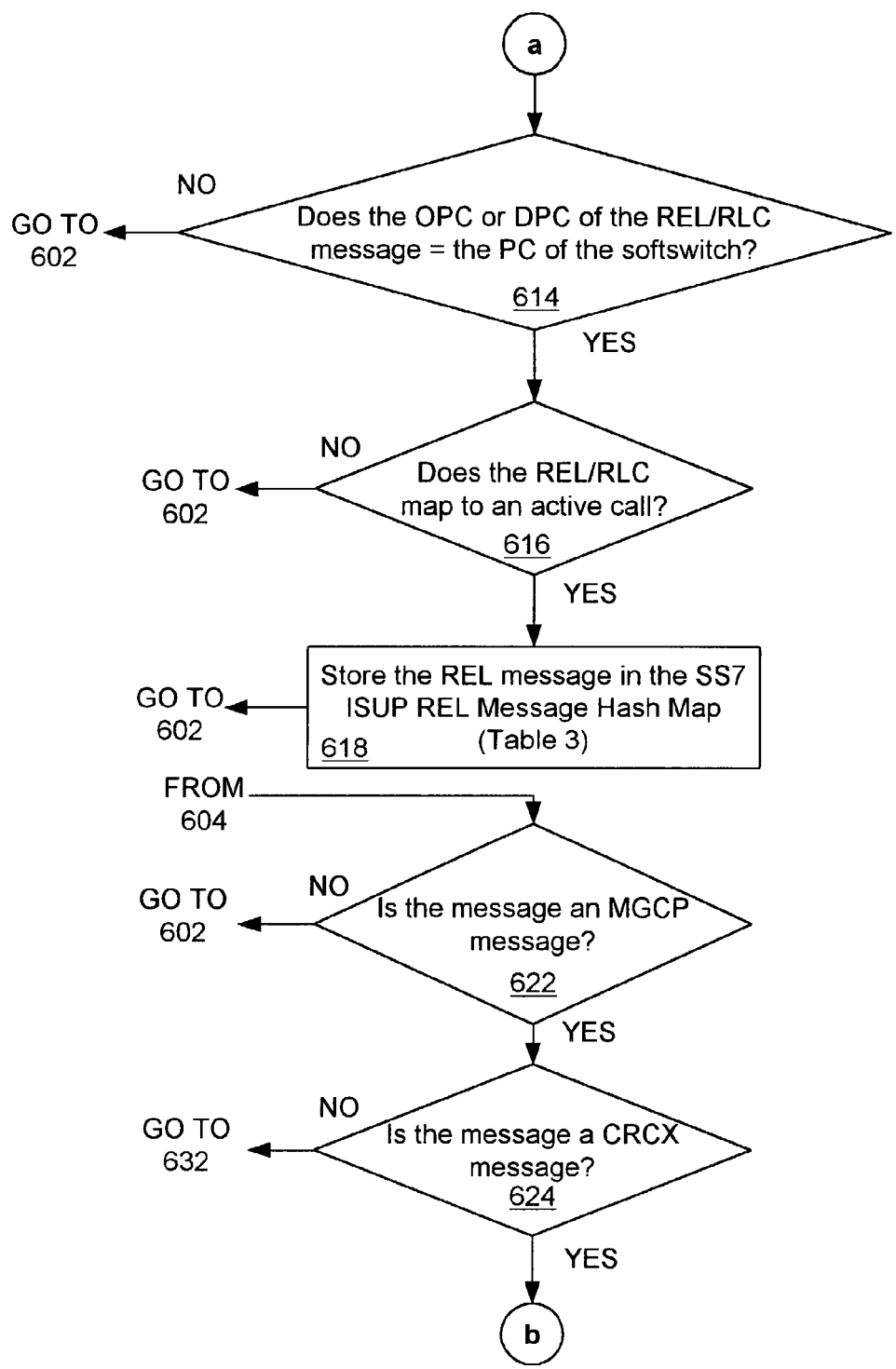
Figure 6C:
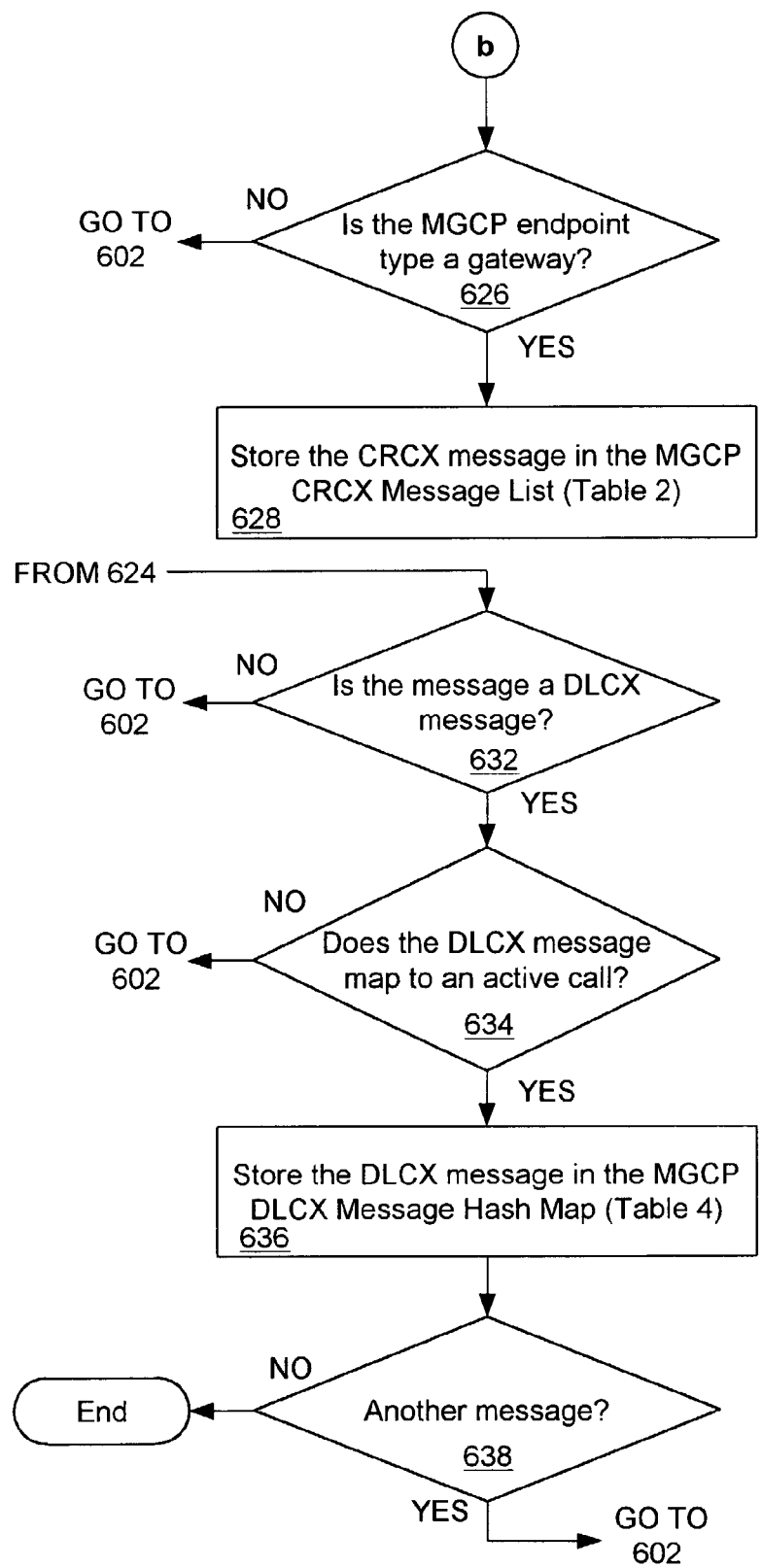

FIGS. 6A through 6C comprise a flowchart 600 collectively illustrating the operation of the message acquisition software 241 of FIG. 2. In block 602 the message acquisition software 241 detects a communication message. In block 604 it is determined whether the communication message is an SS7 ISUP message. If the message is not an SS7 ISUP message, then the process proceeds to block 622, as will be described below. If, however, in block 604 it is determined that the communication message is an SS7 ISUP message, then, in block 606 it is determined whether the message is an IAM message. If it is determined in block 606 that the message is not an IAM message, then, in block 612 it is determined whether the SS7 ISUP message is an REL, (or an RLC) message.

If it was determined in block 606 that the SS7 ISUP message is an IAM message, then, in block 608 the message acquisition software 241 determines whether the OPC or the DPC of the IAM message equals the point code (PC) of the softswitch 164. If, in block 608 it is determined that either the OPC or the DPC of the IAM message equals the PC of the softswitch 164, then, in block 610, the IAM message is stored in the SS7 ISUP IAM message list (Table 1). The process then proceeds back to step 602. If the answer to the question in block 608 is negative, then, the process returns to block 602.

In block 612 it is determined whether the SS7 ISUP message is a call tear-down message (i.e., either an SS7 ISUP REL or RLC message). If the message is an REL or an RLC message, then, in block 614, the message acquisition software 241 determines whether the OPC or the DPC of the REL (or RLC) message equals the PC of the softswitch 164.

If, in block 614, it is determined that the OPC or the DPC of the REL (RLC) message equals the PC of the softswitch 164, then, in block 616 it is determined whether the REL (RLC) message maps to an active call. In other words, it is determined whether the PC of the REL (RLC) message can be found in Table 1 or Table 5. If the answers to the questions in either block 614 or 616 are negative, then, the process proceeds to block 602.

If, in block 616, it is determined that the REL (RLC) message maps to an active call, then, in block 618, the REL message is stored in the SS7 ISUP REL message hash map (Table 3). If the message is an RLC message, then it would be stored in a similar table. The process then reverts to block 602.

In block 622, and assuming that in block 604 the message was determined not to be an SS7 ISUP message, it is determined whether the message is an MGCP message. If the message is not an MGCP message, then the process reverts to block 602. If, however, in block 622 it is determined that the message is an MGCP message, then, in block 624, it is determined whether the MGCP message is a call setup message (i.e., a CRCX message). If it is determined in block 624 that the MGCP message is a CRCX message, then, in block 626, it is determined whether the MGCP end point is a gateway. If, in block 624 it is determined that the message is not a CRCX message, then the process proceeds to block 632, as will be described below.

If, in block 626, it is determined that the MGCP end point is a gateway, then, in block 628, the CRCX message is stored in the MGCP CRCX message list (Table 2). If the answer to the question in block 626 is negative, then the process reverts to block 602.

In block 632, assuming that in block 624 it was determined that the MGCP was not a CRCX message, it is determined whether the MGCP message is a DLCX message. If it is determined in block 632 that the message is a DLCX message, then, in block 634 it is determined whether the DLCX message maps to an active call. In other words, it is determined whether the Call ID of the DLCX message can be found in the MGCP CRCX message list (Table 2). If the answer to the question in block 634 is yes, then, in block 636, the DLCX message is stored in the MGCP DLCX message hash map (Table 4). If it is determined in block 634 that the DLCX message does not map to an active call, then, the process reverts to block 602. In block 638 it is determined whether there is another message. If there is not another message the process ends. If another message exists, then the process reverts. back to block 602.

Figure 7A:
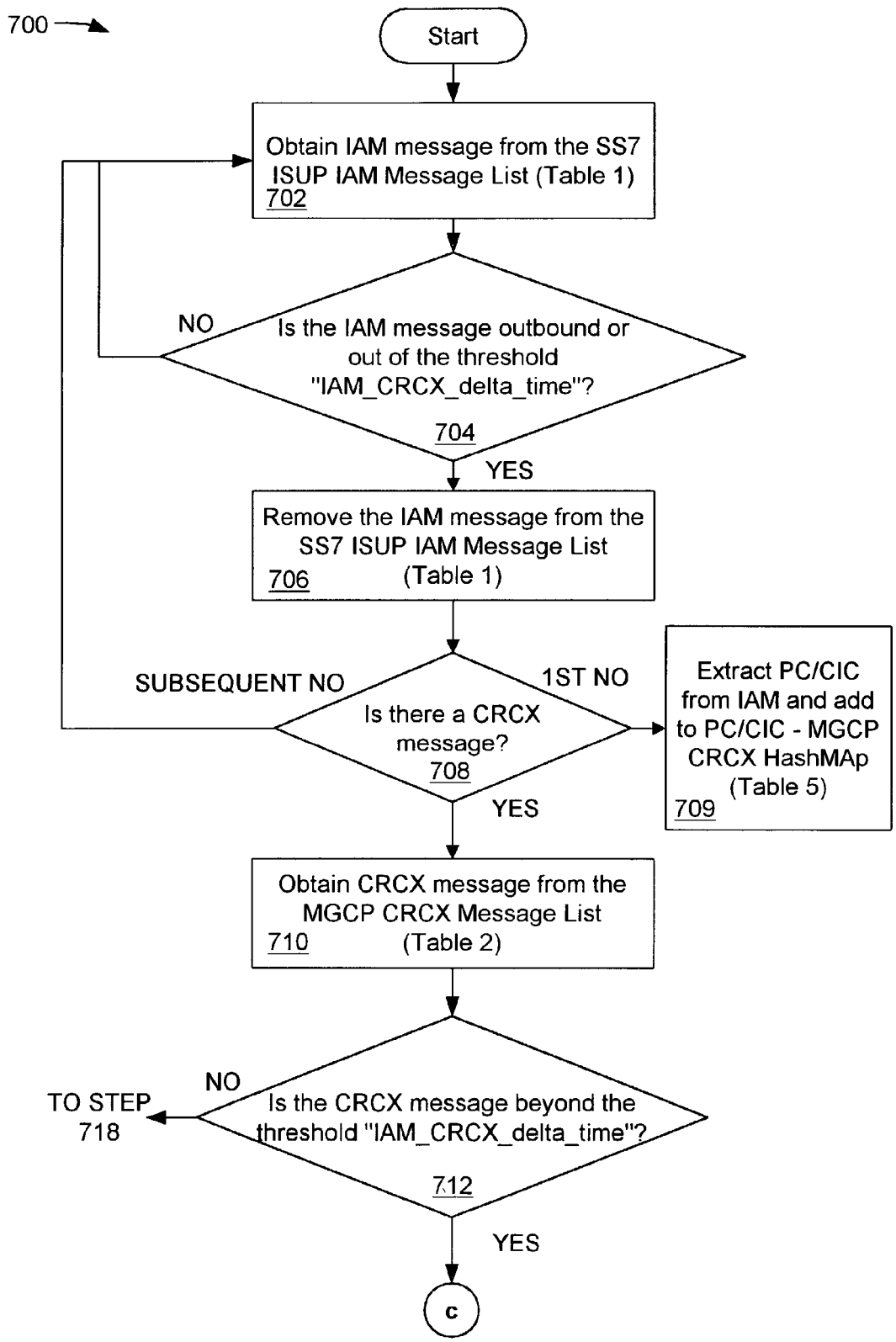
FIGS. 7A through 7C comprise a flowchart collectively illustrating the operation of the setup message software of FIG. 2.
Figure 7B:
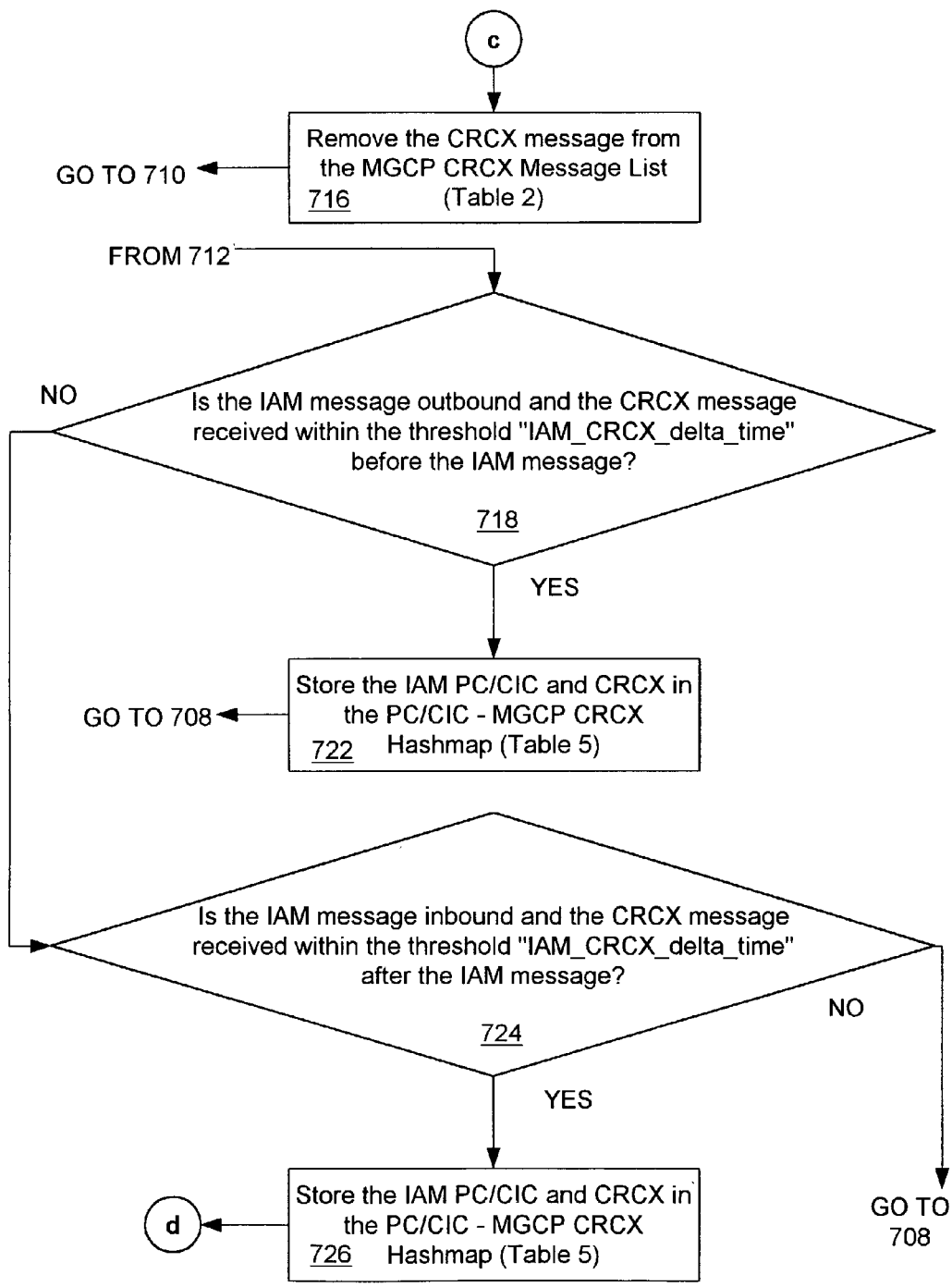
Figure 7C:
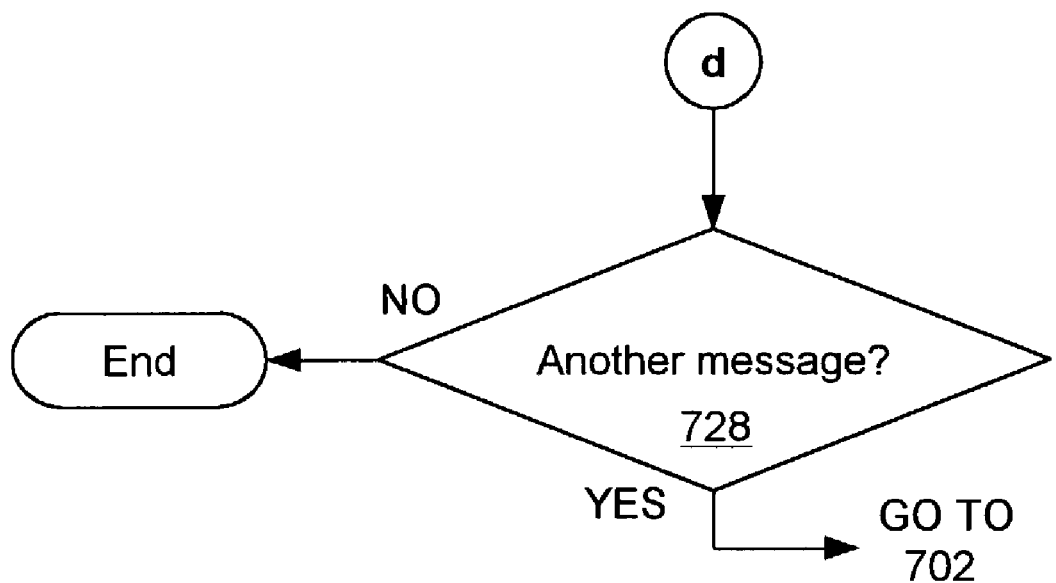

FIGS. 7A through 7C comprise a flowchart 700 collectively illustrating the operation of the setup message software 242 of FIG. 2. In block 702 the setup message software 242 obtains an IAM message from the SS7 ISUP IAM message list (Table 1).

In block 704 it is determined whether the IAM message is either an outbound message or is outside of the time threshold "IAM_CRCX_delta_time." If the IAM message is neither outbound nor is outside of the time threshold "IAM_CRCX_delta_time," the process returns to 702, whereby the setup message software 242 obtains the next IAM message from Table 1. If the IAM message is outbound or is outside of the time threshold "IAM_CRCX_delta_time," in block 706, the IAM message is removed from the SS7 ISUP IAM message list (Table 1) and the process proceeds to block 708.

In block 708, it is determined whether a CRCX message exists in Table 2. If this is the first IAM (block 702) and the answer is no, then, in block 709, the PC/CIC is extracted from the IAM and added to the PC/CIC—MGCP CRCX hash map (Table 5). If the answer to the question in block 708 is no for a subsequent IAM message, then the process reverts to block 702. If it is determined in block 708 that a CRCX message does exist, then, in block 710, the CRCX message is obtained from the MGCP CRCX message list (Table 2).

In block 712 it is determined whether the CRCX message is beyond the threshold "IAM_CRCX_delta_time." If the CRCX message is not beyond the threshold "IAM_CRCX_delta_time," then the process jumps to block 718, which will be described below. If, however, the CRCX message is beyond the threshold "IAM_CRCX_delta_time," then, in block 716, the CRCX message is removed from the MGCP CRCX message list (Table 2).

If it was determined in block 712 that the CRCX message is not beyond the threshold "IAM_CRCX_delta_time," then, in block 718, it is determined whether the IAM message is outbound and whether the CRCX message is received within the threshold "IAM_CRCX_delta_time" before the IAM message. If the answer to the question in block 718 is no, then the process proceeds to block 724, which will be described in further detail below. If, however, the answer to the question in block 718 is yes, then, in block 722, the IAM PC/CIC and the CRCX is stored in the PC/CIC—MGCP CRCX hash map (Table 5) and the process reverts to block 708.

If the answer to the question in block 718 was no, then, in block 724, it is determined whether the IAM message is inbound and whether the CRCX message was received within the threshold "IAM_CRCX_delta_time" after the IAM message. If the answer to the question in block 724 is no, then the process returns to block 708. If, however, the answer to the question in block 724 is yes, then, in block 726, the setup message software 242, stores the IAM PC/CIC and CRCX in the PC/CIC-MGCP CRCX hash map (Table 5).

In block 728 it is determined whether another IAM message exists in the SS7 ISUP IAM message list (Table 1). If yes, then the process returns to block 702. If not, the process ends.

Figure 8A:
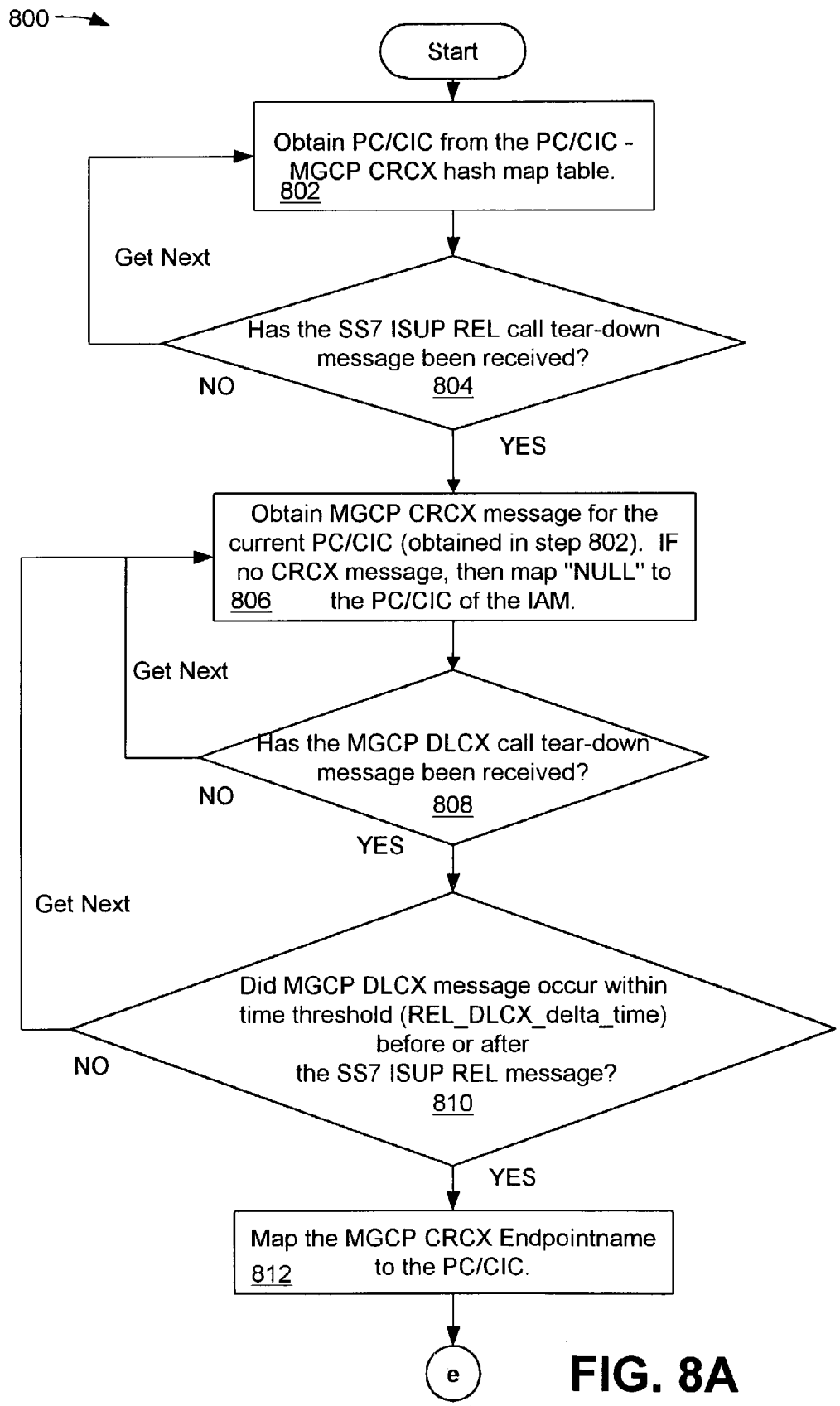
FIGS. 8A and 8B comprise a flowchart collectively illustrating the operation of the final mapping software of FIG. 2.
Figure 8B:
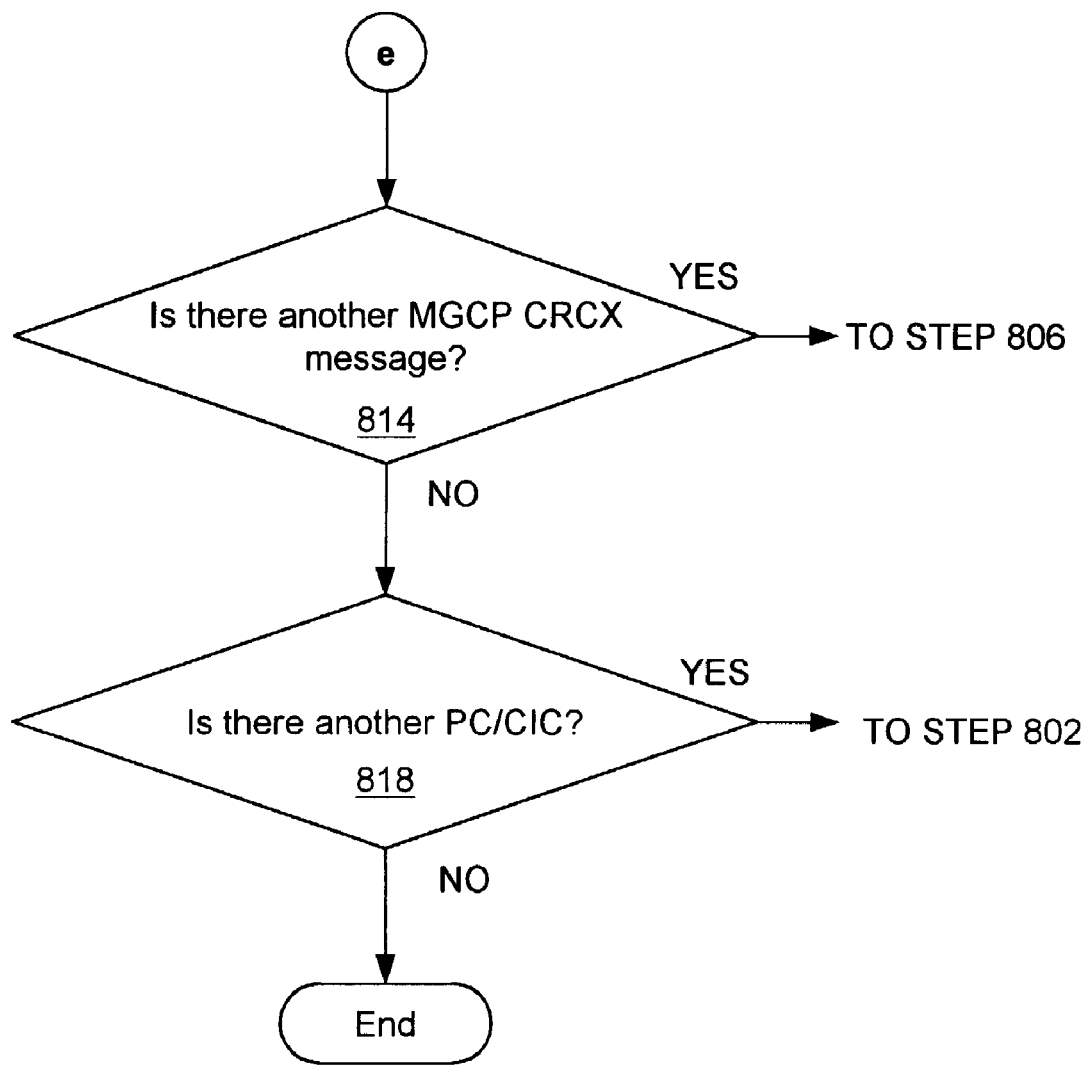

FIGS. 8A and 8B comprise a flowchart 800 collectively illustrating the operation of the final mapping software 243 of FIG. 2. In block 802 the final mapping software 243 obtains a PC/CIC from the PC/CIC-MGCP CRCX hash map (Table 5) above. In block 804 it is determined whether an SS7 ISUP REL call tear-down message has been detected by the message acquisition software 241. If a call tear-down message has not been received then the process returns to block 802 to obtain the next PC/CIC from the PC/CIC-MGCP CRCX hash map (Table 5).

If an SS7 ISUP REL (or RLC) has been detected in block 804, then, in block 806, the final mapping software 243 obtains an MGCP CRCX message (Table 5) for the current PC/CIC obtained in step 802. If no CRCX message is associated with the subject IAM message, then a "NULL" is mapped to the PC/CIC of the IAM.

In block 808 it is determined whether an MGCP DLCX call tear-down message has been detected by the message acquisition software 241. If not, then the process returns to block 806. If, however, in block 808 an MGCP DLCX call tear-down message has been detected, then, in block 810, it is determined whether the MGCP DLCX message occurred within the time threshold REL_DLCX_delta_time, either before or after the receipt of the corresponding SS7 ISUP REL (or RLC) message.

If, in block 810, the MGCP DLCX message did not occur within the prescribed time threshold the message is ignored, and the process returns to block 806 for the next MGCP CRCX message. However, if the MGCP DLCX message did occur within the prescribed time period either before or after the receipt of the SS7 ISUP REL (or RLC) (tear-down) message, then, in block 812, the final mapping software 243 will map the MGCP CRCX endpoint name to the corresponding PC/CIC. This is illustrated in FIG. 10, which illustrates a mapping table 1000. In FIG. 10, the PC/CIC 146–193–14+131 is mapped to the endpoint S4/DS1-1/1@TGR02COS.cos0.company.net.

In block 814 it is determined whether another MGCP CRCX message is associated with the subject PC/CIC. If yes, then the process proceeds back to block 806. If there is not another MGCP CRCX message associated with the subject PC/CIC, then the process proceeds to block 818. In block 818 it is determined whether there is another PC/CIC in Table 5. If there is another PC/CIC to which an MGCP endpoint is to be mapped, then the process returns to block 802 and obtains the next PC/CIC from the hash map Table 5 and the process in FIGS. 8A and 8B is repeated. If the last PC/CIC has been analyzed, then the process ends.

Figure 9A:
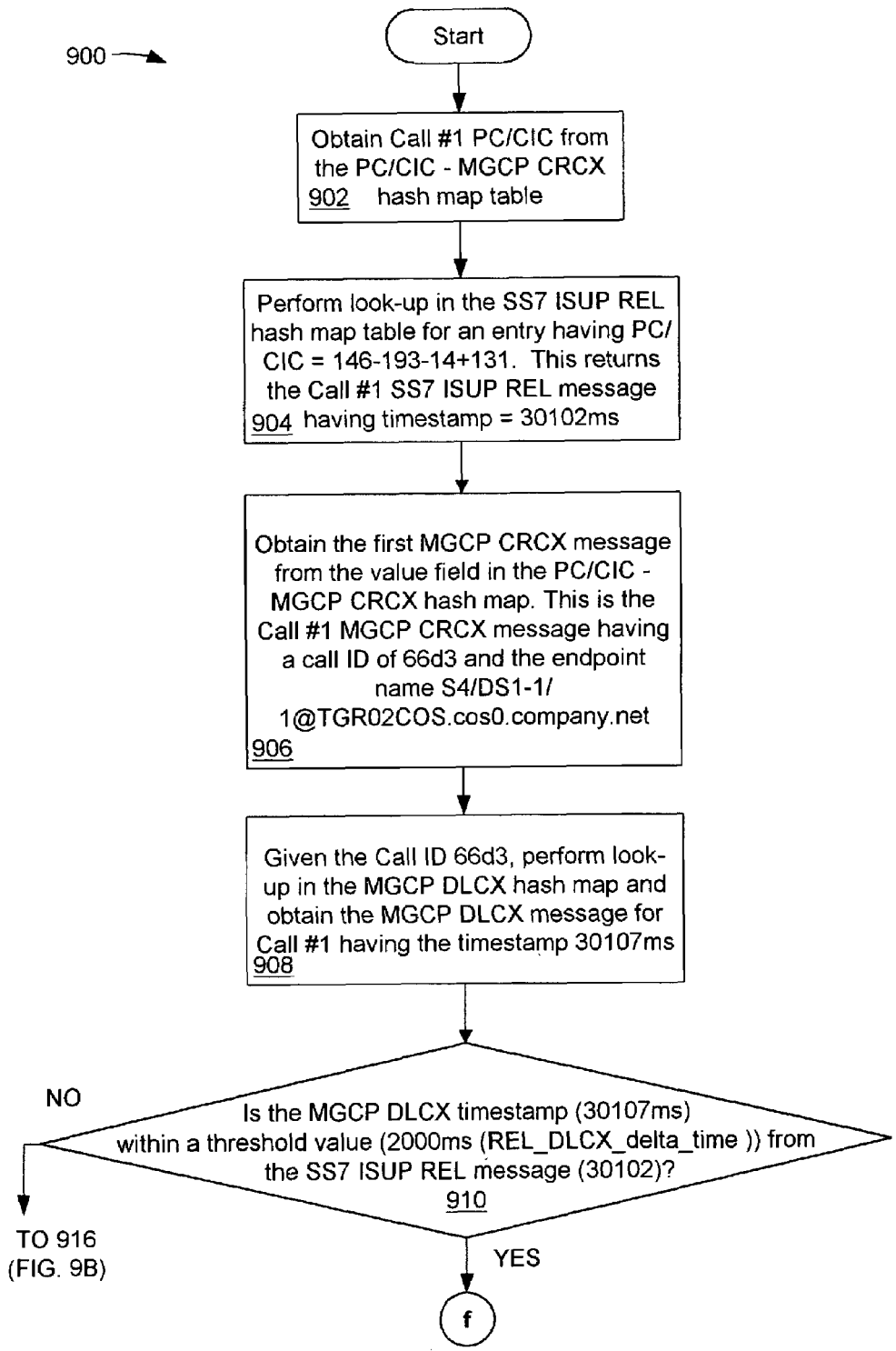
FIGS. 9A, 9B and 9C comprise a flowchart collectively illustrating the operation of certain embodiments of the invention with regard to the three calls illustrated in FIGS. 5A and 5B.
Figure 9B:
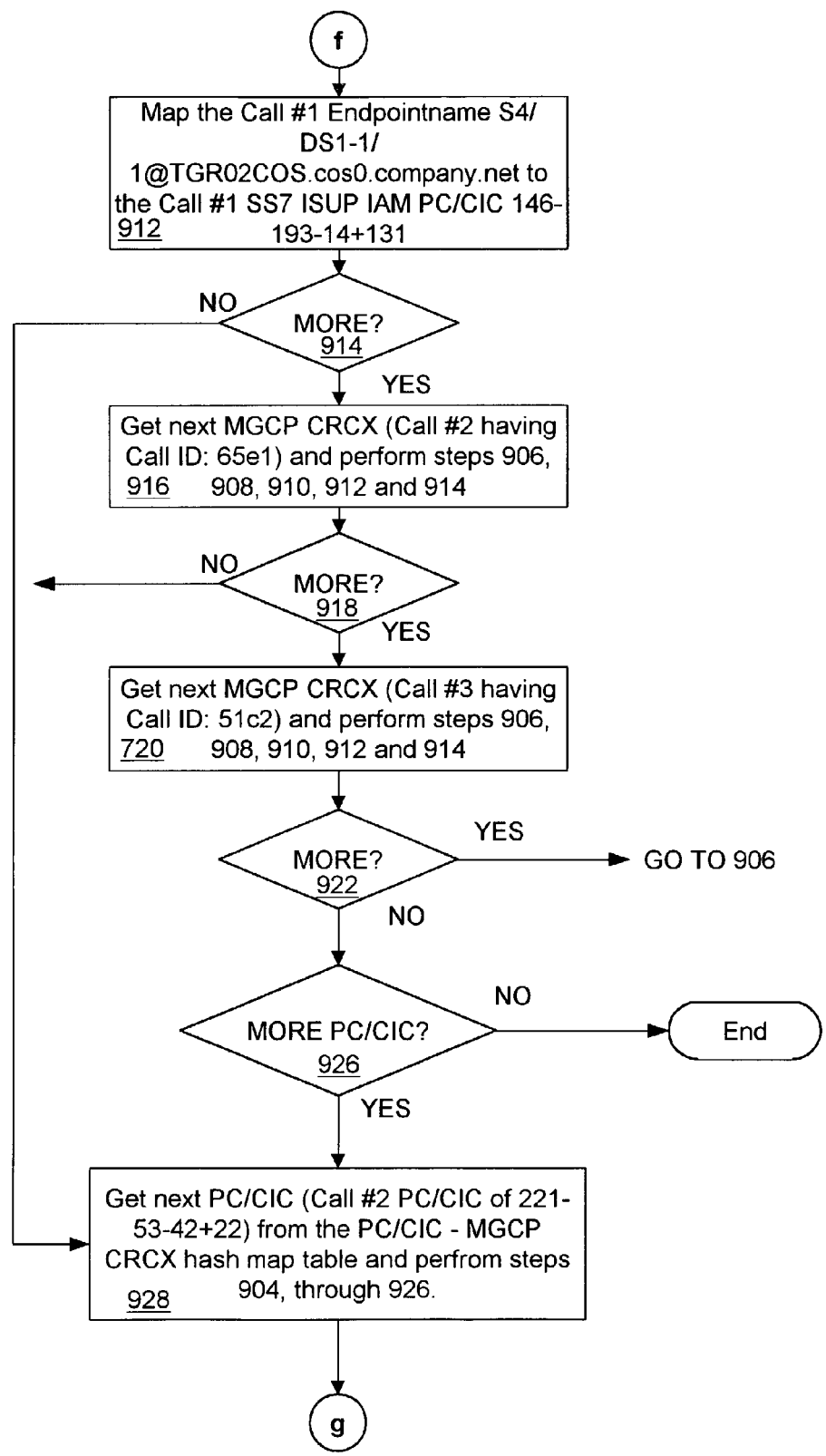
Figure 9C:
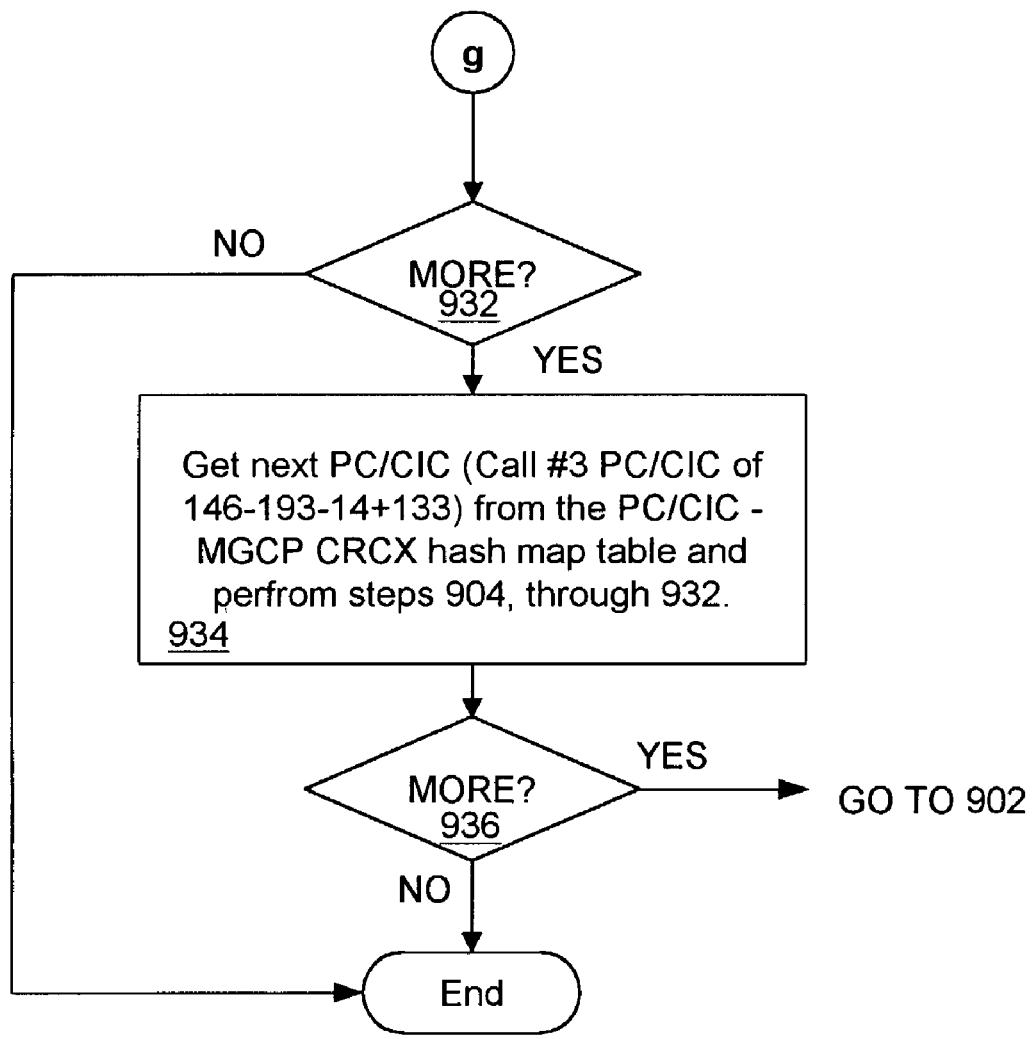

FIGS. 9A, 9B and 9C collectively illustrate a flowchart 900 showing the operation of certain embodiments of the invention with regard to the three calls illustrated in FIGS. 5A and 5B. In block 902, the final mapping software 243 obtains the call #1 PC/CIC (146–193–14+131) from the PC/CIC-MGCP CRCX hash map (Table 5). In block 904, the final mapping software 243 performs a lookup operation in the SS7 ISUP REL hash map (Table 3) for an entry having a PC/CIC equal to 146-193-14+131. This lookup returns the call #1 SS7 ISUP REL message having a timestamp equal to 30102 ms. (See FIG. 5B).

In block 906, the final mapping software 243 obtains the first MGCP CRCX message, which corresponds to the SS7 ISUP REL massage having the PC 146-193-14+131, from the value field in the PC/CIC-MGCP CRCX hash map (Table 5). This corresponds to the call #1 MGCP CRCX message having a Call ID of 66*d*3 and the endpoint name S4/DS1-1-1/1@TGR02COS.cos0.company.net.

In block 908, given the Call ID 66*d*3 found above in block 906, the final mapping software 243 performs a lookup in the MGCP DLCX hash map (Table 4) and obtains the MGCP DLCX (the MGCP call tear-down) message for call #1 having the timestamp 30107 ms.

In block 910 it is determined whether the MGCP DLCX time stamp (30107 ms) is within a threshold value (2000 ms (REL_DLCX_delta_time)) from the time that the SS7 ISUP REL message was received (timestamp 30102).

If the answer to block 910 is no, then the final mapping software 243 will get the next MGCP CRCX message (block 916 in FIG. 9B), and perform steps 906, 908, 910, 912 and 914. If however, the answer to block 910 is yes, then, in block 912, the final mapping software 243 will map the call #1 endpoint name S4/DS1-1/1@TGR02COS.cos0.company.net to the call #1 SS7 ISUP IAM PC/CIC 146-193-14+131. This is illustrated in the table 1000 shown in FIG. 10.

In block 914, it is determined whether there are any additional MGCP CRCX messages in the PC/CIC—MGCP CRCX hash map (Table 5) associated with the PC/CIC of call #1 (146-193-14+131). If not, the process continues to block 928. If the answer to the query in block 914 is yes, then, in block 916, the final mapping software 243 obtains the next MGCP CRCX (call #2 having Call ID 65*e*1) and performs steps 906, 908, 910 and 912.

In block 918, it is determined whether there are any additional MGCP CRCX messages in the PC/CIC—MGCP CRCX hash map (Table 5) associated with the PC/CIC of call #2 (146-193-14+131). If not, the process continues to block 928. If the answer to the query in block 918 is yes, then, in block 920, the final mapping software 243 obtains the next MGCP CRCX (call #3 having Call ID 51*c*2) and performs steps 906, 908, 910, 912 and 914.

In block 922, it is determined whether there are any additional MGCP CRCX messages in the PC/CIC—MGCP CRCX hash map (Table 5) associated with the PC/CIC of call #3 (146-193-14+131). If not (as in this example), the process continues to block 926. If the answer to the query in block 922 is yes, then, the process returns to block 906.

In block 926 it is determined whether there is another PC/CIC in the PC/CIC—MGCP CRCX hash map (Table 5). If no, then the process ends. If the answer is yes, then, in block 928, the final mapping software 243 obtains the next PC/CIC (call #2 PC/CIC having a value of 221-53-42+22) from the PC/CIC-MGCP CRCX hash map (Table 5) and repeats steps 904 through 926, thereby mapping the call #2 endpoint name S4/DS1-2/2@TGR02COS.cos0.company.net to the call #2 SS7 ISUP IAM PC/CIC 221-53-42+22. This is illustrated in the table 1000 shown in FIG. 10.

In block 932 it is determined whether there are any additional PC/CICs. If not, then the process ends. If the answer is yes, then, in block 934, the final mapping software 243 obtains the next PC/CIC (call #3 PC/CIC having a value of 146-193-14+133) from the PC/CIC-MGCP CRCX hash map (Table 5) and repeats steps 906 through 932, thereby mapping the call #3 endpoint name S4/DS1-3/3@TGR02COS.cos0.company.net to the call #3 SS7 ISUP IAM PC/CIC 146-193-14+133. This is illustrated in the table 1000 shown in FIG. 10.

In block 936 it is determined whether there are any additional PC/CICs. If not, then the process ends. If yes, then the process returns to step 902.

FIG. 11 is a chart 1100 illustrating a sample result obtained from the operation of the trunk-to-endpoint mapping software 240 (FIG. 2). Given the information in the Table 1100, a user of the system can consider the likelihood that an endpoint name correctly maps to a particular PC/CIC. For example, the PC/CIC 146-193-14+133 shows that it was mapped to two endpoints and to no endpoint (NULL). The PC/CIC 146-193-14+133 was mapped a total of 114 times. It was mapped 77 times to the endpoint S4/DS1-3/3@TGR02COS.cos0.company.net, three (3) times to no endpoint, and 34 times to the endpoint S4/DS1-2/2@TGR02.COS.cos0.company.net. Given this information, a user could likely infer that the endpoint S4/DS1-3/3@TGR02.COS.cos0.company.net is the correct endpoint to be mapped to the PC/CIC 146-193-14+133.

It will be apparent to those skilled in the art that many modifications and variations may be made to the preferred embodiments of the present invention, as set forth above, without departing substantially from the principles of the present invention. For example, the network analysis system can be used in any communication environment having at least two dissimilar communication signaling protocols. Furthermore, while illustrated using MGCP as the packet network signaling protocol, other signaling protocols, such as Internet Protocol Device Control (IPDC), Network-based Call Signaling (NCS), Transport Adapter Layer Interface (TALI), Signaling Transport (SIGTRAN), and Simple Gateway Control Protocol (SGCP) can be analyzed by the operation of embodiments of the invention. All such modifications and variations are intended to be included herein within the scope of the present invention, as defined in the claims that follow.

What is claimed is:

1. An analysis device, comprising:
    a first acquisition module for acquiring a first plurality of call setup messages and a first plurality of call tear-down messages that are i) carried over a first communication network, and ii) associated with a first communication protocol;
    a second acquisition module for acquiring a second plurality of call setup messages and a second plurality of call tear-down messages that are i) carried over a second communication network, and ii) associated with a second communication protocol;
    a processor;
    a memory; and
    a mapping element that is stored in the memory and executed by the processor, the mapping element i) respectively detecting first and second pluralities of call setup identifiers in the first and second pluralities of call setup messages, ii) respectively detecting first and second pluralities of call tear-down identifiers in the first and second pluralities of call tear-down messages, iii) correlating ones of the first call setup identifiers with ones of the first call tear-down identifiers, iv) correlating ones of the second call setup identifiers with ones of the second call tear-down identifiers, and v) mapping A) correlated ones of the first call setup identifiers and first call tear-down identifiers to B) correlated ones of the second call setup identifiers and second call tear-down identifiers, based on ones of the first call setup identifiers and second call setup identifiers being within a first delta time, and based on ones of the first call tear-down identifiers and second call tear-down identifiers being within a second delta time.

2. The analysis device of claim 1, wherein the first acquisition module is a T1/E1 acquisition module for acquiring PSTN call signaling messages carried on a PSTN, and wherein the second acquisition module is a packet acquisition module for acquiring packet network call signaling messages carried on a packet network.

3. The analysis device of claim 2, wherein:
the mapping element is a trunk-to-endpoint mapping element;
the ones of the first call setup identifiers and the ones of the first call tear-down identifiers are correlated based on common PSTN trunk identification;
the ones of the second call setup identifiers and the ones of the second call tear-down identifiers are correlated based on common packet network endpoint identification; and
the mapping element's mapping of A) the correlated ones of the first call setup identifiers and first call tear-down identifiers to B) the correlated ones of the second call setup identifiers and second call tear-down identifiers maps PSTN trunks to packet network endpoints.

4. The analysis device of claim 3, wherein the mapping element compiles counts of the number of times a PSTN trunk is mapped to a packet network endpoint.

5. The analysis device of claim 1, wherein the mapping element compiles counts of the number of times that A) the correlated ones of the first call setup identifiers and first call tear-down identifiers are mapped to B) the correlated ones of the second call setup identifiers and second call tear-down identifiers.

6. The analysis device of claim 1, wherein the mapping element's mappings are saved to the memory.

7. The analysis device of claim 1, further comprising a display, wherein the mapping element's mappings are output to the display for viewing.

8. The analysis device of claim 1, wherein the first communication protocol complies with signaling system seven integrated services digital network user part (SS7 ISUP).

9. The analysis device of claim 1, wherein the second communication protocol complies with media gateway control protocol (MGCP).

10. The analysis device of claim 1, wherein the first plurality of call setup identifiers and the first plurality of call tear-down identifiers comprise point code circuit identification code (PC/CIC) identifiers, and wherein the second plurality of call setup identifiers and second plurality of call tear-down identifiers comprise media gateway control protocol (MGCP) endpoint identifiers.

11. A method, comprising:
detecting, on a first communication network, a first plurality of call setup messages and a first plurality of call tear-down messages using a first communication protocol;
detecting, on a second communication network, a second plurality of call setup messages and a second plurality of call tear-down messages using a second communication protocol;
respectively detecting first and second pluralities of call setup identifiers in the first and second pluralities of call setup messages;
respectively detecting first and second pluralities of call tear-down identifiers in the first and second pluralities of call tear-down messages;
correlating ones of the first call setup identifiers with ones of the first call tear-down identifiers;
correlating ones of the second call setup identifiers with ones of the second call tear-down identifiers; and
mapping A) correlated ones of the first call setup identifiers and first call tear-down identifiers to B) correlated ones of the second call setup identifiers and second call tear-down identifiers, based on ones of the first call setup identifiers and second call setup identifiers being within a first delta time, and based on ones of the first call tear-down identifiers and second call tear-down identifiers being within a second delta time.

12. The method of claim 11, wherein the first communication network is a PSTN and the second communication network is a packet network.

13. The method of claim 12, wherein:
the ones of the first call setup identifiers and the ones of the first call tear-down identifiers are correlated based on common PSTN trunk identification
the ones of the second call setup identifiers and the ones of the second call tear-down identifiers are correlated based on common packet network endpoint identification; and
mapping A) the correlated ones of the first call setup identifiers and first call tear-down identifiers to B) the correlated ones of the second call setup identifiers and second call tear-down identifiers maps PSTN trunks to packet network endpoints.

14. The method of claim 13, further comprising, compiling counts of the number of times a PSTN trunk is mapped to a packet network endpoint.

15. The method of claim 11, further comprising, compiling counts of the number of times that A) the correlated ones of the first call setup identifiers and first call tear-down identifiers are mapped to B) the correlated ones of the second call setup identifiers and second call tear-down identifiers.

16. The method of claim 11, further comprising, outputting the mappings to a display for viewing.

17. The method of claim 11, wherein the first communication protocol complies with signaling system seven integrated services digital network user part (SS7 ISUP).

18. The method of claim 11, wherein the second communication protocol complies with media gateway control protocol (MGCP).

19. The method of claim 11, wherein the first plurality of call setup identifiers and the first plurality of call tear-down identifiers comprise point code circuit identification code (PC/CIC) identifiers, and wherein the second plurality of call setup identifiers and second plurality of call tear-down identifiers comprise media gateway control protocol (MGCP) endpoint identifiers.

20. A computer readable medium having a program, comprising:
logic for receiving from a first communication network, a first plurality of call setup messages and a first plurality of call tear-down messages using a first communication protocol;
logic for receiving from a second communication network, a second plurality of call setup messages and a second plurality of call tear-down messages using a second communication protocol;

logic for respectively detecting first and second pluralities of call setup identifiers in the first and second pluralities of call setup messages;

logic for respectively detecting first and second pluralities of call tear-down identifiers in the first and second pluralities of call tear-down messages;

logic for correlating ones of the first call setup identifiers with ones of the first call tear-down identifiers;

logic for correlating ones of the second call setup identifiers with ones of the second call tear-down identifiers; and logic for mapping A) correlated ones of the first call setup identifiers and first call tear-down identifiers to B) correlated ones of the second call setup identifiers and second call tear-down identifiers, based on ones of the first call setup identifiers and second call setup identifiers being within a first delta time, and based on ones of the first call tear-down identifiers and second call tear-down identifiers being within a second delta time.

\* \* \* \* \*